US009154058B2

(12) United States Patent
Baughman et al.

(10) Patent No.: US 9,154,058 B2
(45) Date of Patent: Oct. 6, 2015

(54) NANOFIBER ACTUATORS AND STRAIN AMPLIFIERS

(75) Inventors: Ray H. Baughman, Dallas, TX (US); Ali E. Aliev, Dallas, TX (US); Jiyoung Oh, Richardson, TX (US); Mikhail Kozlov, Dallas, TX (US); Shaoli Fang, Richardson, TX (US); Raquel Ovalle-Robles, Sachse, TX (US); Anvar A. Zakhidov, McKinney, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1047 days.

(21) Appl. No.: 13/125,993

(22) PCT Filed: Aug. 17, 2009

(86) PCT No.: PCT/US2009/054017
§ 371 (c)(1),
(2), (4) Date: Jul. 18, 2011

(87) PCT Pub. No.: WO2010/019942
PCT Pub. Date: Feb. 18, 2010

(65) Prior Publication Data
US 2012/0000293 A1 Jan. 5, 2012

Related U.S. Application Data

(60) Provisional application No. 61/089,275, filed on Aug. 15, 2008.

(51) Int. Cl.
*H02N 11/00* (2006.01)
*H02N 1/00* (2006.01)
(52) U.S. Cl.
CPC ............. *H02N 11/006* (2013.01); *H02N 1/006* (2013.01)

(58) Field of Classification Search
CPC ............................ H02N 1/006; H02N 11/006
See application file for complete search history.

(56) References Cited

U.S. PATENT DOCUMENTS

2005/0122007 A1* 6/2005 Ishibashi et al. ............... 310/800
2006/0266981 A1* 11/2006 Asaka et al. .................... 252/500
(Continued)

FOREIGN PATENT DOCUMENTS

CN 1410486 A 4/2003
WO WO 00/50771 A1 8/2000

OTHER PUBLICATIONS

J. Suhr, P. Victor, L. Ci, S. Sreekala, X. Zhang, O. Nalamasu, P. M. Ajayan, "Fatigue resistance of aligned carbon nanotube arrays under cyclic compression," Nature Nanotechnology 2, 417-421, Jul. 1, 2007.*

(Continued)

*Primary Examiner* — Lisa Caputo
*Assistant Examiner* — Punam Roy
(74) *Attorney, Agent, or Firm* — Greenberg Traurig, LLP; Ross Spencer Garsson

(57) ABSTRACT

Nanofiber actuators and strain amplifiers having a material that generates a force or generates a displacement when directly or indirectly electrically driven. This material is an aerogel or a related low density or high density network comprising conducting fibers that are electrically interconnected and can substantially actuate without the required presence of either a liquid or solid electrolyte. Reversible or permanently frozen actuation is used to modify the properties of the actuator material for applications.

30 Claims, 20 Drawing Sheets

(56) References Cited

U.S. PATENT DOCUMENTS

| | | | |
|---|---|---|---|
| 2007/0170071 A1* | 7/2007 | Suh et al. | 205/687 |
| 2008/0170982 A1* | 7/2008 | Zhang et al. | 423/447.3 |
| 2009/0115286 A1* | 5/2009 | Asaka et al. | 310/311 |

OTHER PUBLICATIONS

Tuling Lam, Henry Tran, Wei Yuan, Zhibin Yu, SoonMok Ha, Richard Kaner, Qibing Pei, "Polyaniline nanofibers as a novel electrode material for fault-tolerant dielectric elastomer actuators," Proc. SPIE 6927, Electroactive Polymer Actuators and Devices (EAPAD) 2008, (Apr. 10, 2008).*

V. Mottaghitalab, B. Xi, G. M. Spinks, G. G. Wallace, "Polyaniline fibres containing single walled carbon nanotubes: Enhanced performance artificial muscles," Synthetic Metals 156 (2006) 796-803.*

T. Mirfakhrai, J. D. W. Madden, R. H. Baughman, "Polymer artificial muscles," Materials Today vol. 10 No. 4 (2007) 30-38.*

European Patent Office; International Search Report PCT/US2009/054017; Dec. 17, 2010; NL.

Ahir et al; Photomechanical actuation in polymer-nanotube composites; Nature Materials; vol. 4; Jun. 2005; pp. 491-495; Nature Publishing Group; US.

Aliev et al; Giant-Stroke, Superelestic Carbon Nanotube Aerogel Muscles; Science 323, 1575: Mar. 20, 2009; pp. 1575-1578; American Association for the Advancement of Science; Washington, DC.

Baughman, Ray H; Avoiding the shrink; Nature; vol. 425; Oct. 16, 2003; p. 667; Nature Publishing Group; US.

Baughman et al; Carbon Nanotube Actuators; Science 284, 1340; Aug. 17, 2009; pp. 1340-1344; American Association for the Advancement of Science; Washington, DC.

Baughman et al; Materials with Negative Compressibilities in One or More Dimensions; Science 279,1522; Aug. 17, 2009; pp. 1522-1524; American Association for the Advancement of Science; Washington, DC.

Courty et al; Nematic elastomers with aligned carbon nanotubes: New electromechanical actuators; Europhysics Letters, 64 (5), pp. 654-660; Dec. 1, 2003; EDP Sciences; Les Ulis Cedex A; France.

Deshpande et al: Carbon Nanotube Linear Bearing Nanoswitches; Nano letters, vol. 6, No. 6; May 10, 2006; pp. 1092-1095; American Chemical Society; US.

Ebron et al; Fuel Powered Artificial Muscles; Science 311, 1580; Aug. 17, 2009; pp. 1580-1583; American Association for the Advancement of Science; Washington, DC.

Evans, et al; Auxetic Materials: Functional Materials and Structures from Lateral Thinking!; Advanced Materials; 2000, 12, No. 9; 2000; pp. 617-628; Wiley-VCH Verlag GmbH; Weinheim; Germany.

Gupta et al; Charge transfer in carbon nanotube actuators investigated using in situ Raman spectroscopy; Journal of Applied Physics; vol. 95, No. 4; Feb. 15, 2004; pp. 2038-2048; American Institute of Physics; US.

Hughes et al; Nanobelts as nanocantilevers; Applied Physics Letters; vol. 82, No. 17; Apr. 28, 2003; pp. 2886-2888; American Institute of Physics; US.

Kim et al; Nanotube Nanotweezers; Science 286, 2148 (1999); Dec. 10, 1999; pp. 2148-2150; Science; American Association for the Advancement of Science; Washington, DC.

Koerner et al; Remotely actuated polymer nanocomposites-stress-recovery of carbon-nanotube filled thermoplastic elastomers; Nature Materials; vol. 3; Feb. 2004; pp. 115-120; Nature Publishing Group; US.

Lawrence Livermore Labs: Lab's aerogel sets world record; Laboratory in the News; Oct. 8, 2003; 2 pages; Lawrence Livermore National Laboratory; Operated by the University of California for the U.S. Department of Energy; US.

Li et al; Mg2Zn11—MgO belt like nanocables; Chemical Physics Letters 375 (2003) pp. 102-105; Elsevier Science B.V.; The Netherlands.

Liu et al; Synthesis of Carbon Nanotubes and Nanobelts through a Medial-Reduction Method; J. Phys. Chem. B 2003; 107; Jun. 7, 2003; pp. 6329-6332; American Chemical Society; US.

Madden, et at: Artificial Muscle Technology: Physical Principles and Naval Prospects; IEEE Journal of Oceanic Engineering; vol. 29, No. 3; Jul. 2004; pp. 706-728; Institute of Electrical and Electronics Engineers; US.

Miaudet et al; Shape and Temperature Memory of Nanocomposites with Broadened Glass Transition; Science 318, 1294 (2007); Nov. 23, 2007; pp. 1294-1296; American Association for the Advancement of Science; Washington, OC.

Pelrine et al; High-Speed Electrically Actuated Elastomers with Strain Greater Than 100%; Science 287, 836 (2000); Feb. 4, 2000; pp. 836-839; American Association for the Advancement of Science; Washington, DC.

Rueckes et al; Carbon Nanotube-Based Nonvolatile Random Access Memory for Molecular Computing; Science 289, 94 (2000); Jul. 7, 2000; pp. 94-97; American Association for the Advancement of Science; Washington, DC.

Spinks et al; Pneumatic Carbon Nanotube Actuators; Advanced Materials; 2002, 14, No. 23; Dec. 3, 2002; pp. 1728-1732; Wiley-VCH Verlag Gmbh & Co; Weinheim, Germany.

Takashima et al; Electrochemically generated deformations of polyanilin film plasticized with di-2-butoxy-2-ethoxy-ether ester of Sulfosuccinic acid; Sensors and Actuators B Chemical B 99 (2004); pp. 601-607; 2004; Elsevier B.V.; The Netherlands.

Ulbricht et al; Transparent carbon nanotube sheets as 3-D charge collectors in organic solar cells; Solar Energy Materials and Solar Cells 91(2007); 2007; pp. 416-419:Elsevier B.V.; The Netherlands.

Viculis et al; A Chemical Route to Carbon Nanoscrolls; Science vol. 299; Feb. 28, 2003; p. 1361; American Association for the Advancement of Science; Washington, DC.

Vohrer et al; Carbon nanotube sheets for the use as artificial muscles; Carbon 42 (2004); 2004; pp. 1159-1164; Elsevier B.V.; The Netherlands.

Von Reden et al; Carbon nanotube foils for electron stripping in tandem accelerators; Nuclear Instruments and methods in Physics Research B 261; 2007; pp. 44-48; Elsevier B.V.; The Netherlands.

Wang et al; Rectangular Porous ZnO—ZnS Nanocables and ZnS Nanotubes; Advanced Materials 2002 14, No. 23; Dec. 3, 2002; pp. 1732-1735; Wiley-VCH Verlag GmbH & Co; Weinheim Germany.

Wang; Nanobelts, Nanowires, and Nanodiskettes of Semiconducting Oxides—From Materials to Nanodevices: Advanced Materials 2003, 15, No. 5; Mar. 4, 2003; pp. 432-436; Wiley-VCH Verlag GmbH & Co.; Weinheim, Germany.

Xiao et al; Flexible, Stretchable, Transparent Carbon Nanotube Thin Film Loudspeakers; Nano Letters 2008, vol. 8, No. 12; pp. 4539-4545; Oct. 29, 2008; American Chemical Society; US.

Li et al; Bismuth Nanotubes: A Rational Low-Temperature Synthetic Route; J. Am. Chyem. Soc. 2001, 123; pp. 9904-9905; Sep. 14, 2001; American Chemical Society; US.

Li et al; Direct Spinning of Carbon Nanotube Fibers from Chemical Vapor Deposition Synthesis; Science 304, 276 (2004); pp. 276-278; Apr. 19, 2004; American Association for the Advancement of Science; Washington, DC.

Wang et al; Single Crystalline Nanowires of Lead Can Be Synthesized through Thermal Decomposition of Lead Acetate in Ethylene Glycol; Nano Letters 2003,vol. 3, No. 8; pp. 1163-1166; Jun. 26, 2003; American Chemical Society; US.

Zhang, Multifunctional Carbon Nanotube Yarns by Downsizing an Ancient Technology; Science 306, 1358 (2004); pp. 1358-1361; Nov. 19, 2004; American Association for the Advancement of Science; Washington, DC.

Zhang et al; Strong, Transparent, Multifunctional, Carbon Nanotube Sheets; Science 309, 1215 (2005); pp. 1215-1219; Aug. 19, 2005; American Association for the Advancement of Science; Washington, DC.

Zhang et at; Ultrastrong, Stiff, and Lightweight Carbon-Nanotube Fibers; Advanced Materials; 2007, 19; pp. 4198-4201; No month 2007; Wiley-VCH Verlag GmbH; Weinheim, Germany.

* cited by examiner

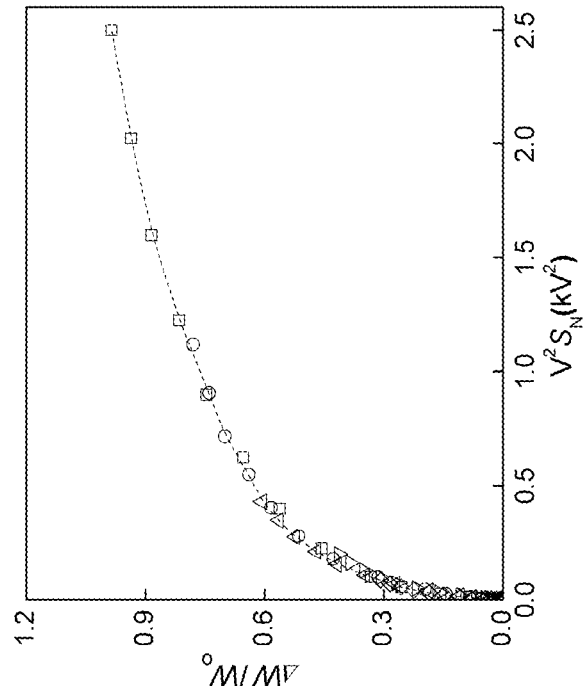
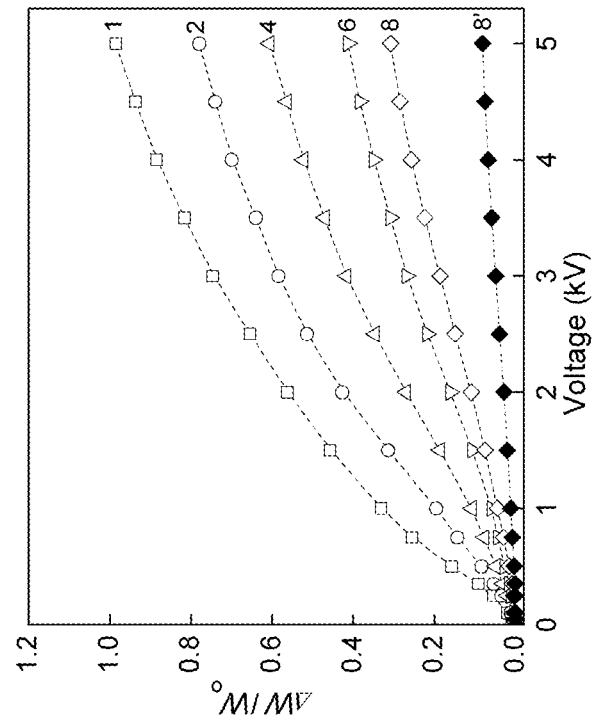
Figure 5B
Figure 5A

NANOFIBER ACTUATORS AND STRAIN AMPLIFIERS

CROSS-REFERENCE TO RELATED PATENT APPLICATION

This application for patent claims the benefit of priority from U.S. Provisional Patent Application Ser. No. 61/089,275, filed Aug. 15, 2008, entitled "Nanofiber Actuators and Strain Amplifiers," which provisional patent application is commonly assigned to the assignee of the present invention, and which disclosure is considered part of and is incorporated by reference in its entirety in the disclosure of this application.

GOVERNMENT INTEREST

This Application for Patent is the 35 U.S.C. §371 national application of International Patent Application No. PCT/US09/54017, filed on Aug. 17, 2009, entitled "Nanofiber Actuators and Strain Amplifiers." This work was supported by the Air Force Office of Scientific Research grant FA9550-05-C-0088, National Science Foundation grant DMI-0609115, Office of Naval Research MURI grant N00014-08-1-0654, and Robert A. Welch Foundation Grant AT-0029. The U.S. government may have certain rights in the invention.

FIELD OF INVENTION

An aerogel or a related low density or high density network comprising conducting fibers that are electrically interconnected and can substantially actuate without the required presence of either a liquid or solid electrolytes providing dimensional changes and stress generation when directly or indirectly electrically powered.

BACKGROUND OF INVENTION

Actuator materials and mechanisms that convert electrical, chemical, thermal, or photonic energy to mechanical energy have been sought for over a century. Nevertheless, humankind has had little success in replicating the wondrous properties of natural muscle, which has meant that the most advanced prosthetic limbs, exoskeletons, and humanoid robots lack critically needed capabilities.

Probably no other material has been described for so many fundamentally different types of actuators than carbon nanotubes. Demonstrated electrically powered and fuel powered nanotube actuators provide up to a few percent actuator stroke and a hundred times higher stress generation than natural muscle. Large stroke pneumatic nanotube actuators have been demonstrated that use electrochemical gas generation within nanotube sheets. In other studies, nanotubes have been used either as electrodes or as additives to profoundly modify the response of other actuating materials—like dielectric, ionically conducting, photoresponsive, shape memory, and liquid crystal polymers.

The following provide examples of these diverse types of actuators based on carbon nanotubes. Electrostatic attraction and repulsion between two nanotubes was used for cantilever-based nano-tweezers [P. Kim, C. M. Lieber, Science 126, 2148-2150 (1999)] and mechanically-based switches and logic elements [T. Rueckes, K. Kim, E. Joselevich, G. Y. Tseng, C.-L. Cheung, C. M. Lieber, Science 289, 94-97 (2000), V. V. Deshpande, H.-Y. Chiu, H. W. Ch. Postma, C. Mikó, L. Forró, M. Bockrath, Nano Letters 6, 1092-1095 (2006)]. On the macroscale, electrically powered [R. H. Baughman et al., Science 284, 1340-1344 (1999); U. Vohrer, I. Kolaric, M. H. Hague, S. Roth, U. Detlaff-Weglikowska, Carbon 42, 1159-1162 (2004); S. Gupta, M. Hughes, A. H. Windle, J. Robertson, J. Appl. Phys. 95, 2038-2042 (2004)] and fuel powered [V. H. Ebron et al., Science 311, 1580-1583 (2006)]carbon nanotube actuators provided up to a few percent actuator stroke and a hundred times higher stress generation than natural muscle. Demonstrated large stroke pneumatic nanotube actuators used electrochemical gas generation within nanotube sheets [G. M. Spinks et al., Advanced Materials 14, 1728-1732 (2002)]. Carbon nanotube composites with organic polymers provided photoresponsive [S. V. Ahir, E. M. Terentjev, Nature Materials 4, 491-495 (2005)], shape memory [H. Koerner, G. Price, N. A. Pearce, M. Alexander, R. A. Vaia, Nature Materials 3, 115-120 (2004), P. Miaudet et al., Science 318, 1294-1296 (2007)], and electromechanical [S. Courty, J. Mine, A. R. Tajbakhsh, E. M. Terentjev, Europhysics Letts. 64, 654-660 (2003)] actuators.

Major limitations exist for the above described carbon nanotube artificial muscles, as well as prior art artificial muscles of any type. These limitations include muscle stroke, stroke rate, cycle lifetime, or temperatures of operation—and in most cases a combination of some of these and other limitations (like energy conversion efficiency).

Embodiments of the present invention provide energy efficient artificial muscles that can operate at extreme temperatures (near 0 K to above 1900 K) where prior-art muscles cannot operate, stroke rates and strokes that can exceed $4 \times 10^4$%/s and 250% in one direction and generate over 30 times higher force than for the same weight and length natural muscle.

In addition to extending the capabilities of artificial muscles to giant strokes and strain rates at extreme temperatures, the actuator mechanism of the present invention enables applications that relate to structural changes during large-stroke actuation. These include, for example, the ability to dynamically modify the diffraction of light at over kilohertz frequencies for optical applications and the ability to tune the density of actuator sheets and then freeze this actuation for optimizing electrodes for organic light-emitting displays, solar cells, charge stripping from ion beams, and cold electron field emission. Prototypical actuator materials are provided that enhance actuation using nanoscale amplification effects, due to giant Poisson's ratios and even negative linear compressibilities. Embodiments of the present invention show that these giant Poisson's ratios can be used to amplify the strokes of other actuator materials and for such applications as sensors.

SUMMARY OF INVENTION

The present invention includes nanofiber-based actuators (such as artificial muscles) and strain amplifiers.

In general, in one aspect, the invention features an electrically powered actuator that includes a counter electrode and an actuating electrode electrically coupled to the counter electrode. The actuating electrode includes a network of electrically interconnected nanofibers. The actuator is configured to change dimension, generate stress, or a combination thereof during actuation of the actuating electrode in the absence of liquid or solid electrolyte. The actuation includes direct or indirect application of voltage to the actuating electrode with respect to the counter electrode.

In general, in another aspect, the invention features a process that includes electrically actuating a conducting material with initial dimensions. The process further includes substantially changing a dimension of the conducting material. The process further includes contacting the actuated material with a substrate or coating or infiltrating the material in the actuated state to permanently stabilize the conducting material in a state between the initial dimensions and the changed dimensions.

In general, in another aspect, the invention features an electrode made by a process that includes electrically actuating a conducting material with initial dimensions. The process further includes substantially changing a dimension of the conducting material. The process further includes contacting the actuated material with a substrate or coating or infiltrating the material in the actuated state to permanently stabilize the conducting material in a state between the initial dimensions and the changed dimensions.

In general, in another aspect, the invention features a solar cell that includes the electrode made by the above process.

In general, in another aspect, the invention features a light emitting diode or diode display that includes the electrode made by the above process.

In general, in another aspect, the invention features a touch screen display that includes the electrode made by the above process.

In general, in another aspect, the invention features an ion transport electrode that includes the electrode made by the above process.

In general, in another aspect, the invention features an electrochemical device that includes the electrode made by the above process.

In general, in another aspect, the invention features a tunable diffraction grating that includes the actuating electrode of the above electrically powered actuator.

In general, in another aspect, the invention features a tunable light polarizer that includes the actuating electrode of the above electrically powered actuator.

In general, in another aspect, the invention features an electrically powered actuator that includes an actuator material (including a network of oriented electrically interconnected nanofibers) and electrical interconnections to an actuating electrode that enable passage of current through the network. The actuator is configured to change dimension, generate stress, or a combination thereof during actuation of the actuating electrode. The actuation is predominately caused by magnetic interactions between nanofibers or nanofiber bundles.

In general, in another aspect, the invention features an electrically powered actuator that includes an actuator material (that includes a network of electrically interconnected nanofibers) and electrical interconnections that enable passage of current through the network. The actuator is configured to change shape, generate stress, or a combination thereof during actuation. The actuation is predominately caused by pressure waves in a surrounding gas generated by resistive heating of the network of electrically interconnected nanofibers.

In general, in another aspect, the invention features a strain amplifier made by a process that includes providing a forest of carbon nanotubes and drawing a nanotube sheet or sheet strip from the forest of carbon nanotubes. The strain amplifier has an amplification factor of at least about 2. The Poisson's ratio for a tensile strain applied in the sheet or strip draw direction is at least about 2.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5A is a graph that shows measured width-direction actuation strain, $\Delta W/W_o$, versus applied voltage for N=1 to 8 stacks of single MWNT aerogel sheets and for a densified 8 sheet stack, labeled 1 to 8 and 8', respectively, having $L_o=25$ mm and $W_o=2$ mm.

FIG. 5B is a universal curve that describes all of the results of FIG. 5A for undensified nanotube sheet stacks by using the normalization factor $S_N=(N^{-1}-R)/(1-R)$, and a single fit parameter R.

DETAILED DESCRIPTION

Figure 1:
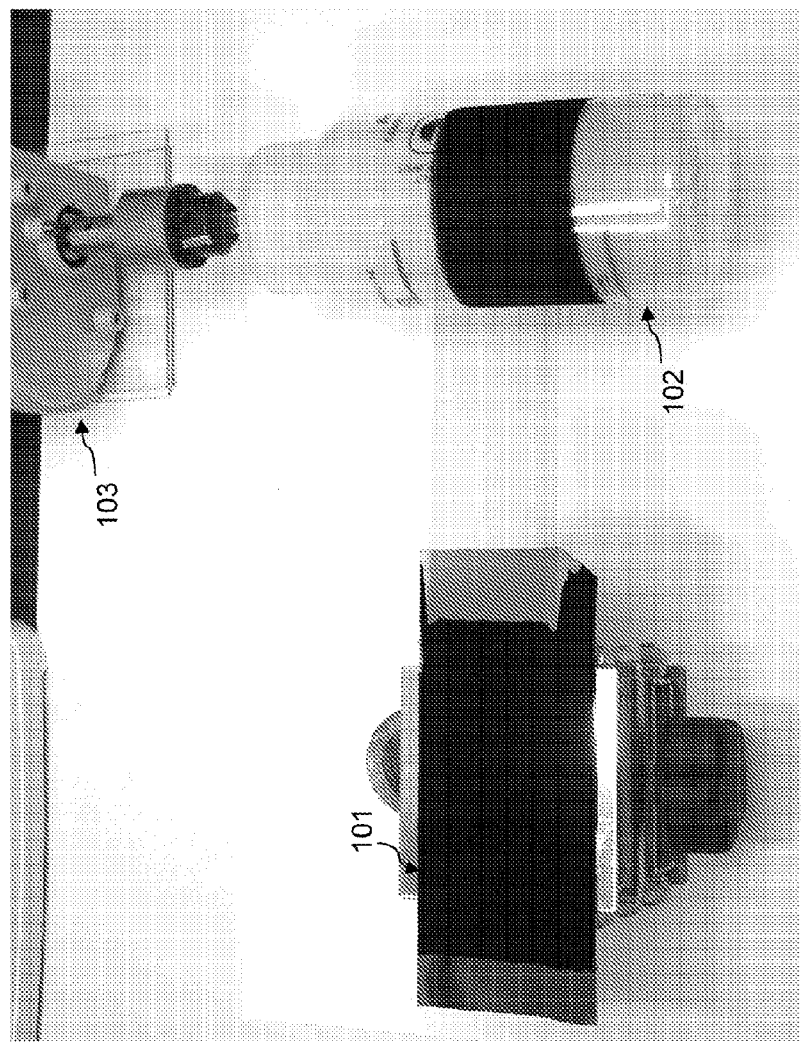
FIG. 1 shows the assembly of a carbon nanotube sheet stack on a rotating mandrel (in this case, a plastic bottle) as a sheet is fabricated by draw from a nanotube forest, which can be usefully employed for fabrication of carbon nanotube actuator electrodes.

The present invention is directed to mechanical actuators comprising a material that generates a force or generates a displacement when directly or indirectly electrically driven. This material, which comprises a network comprising conducting nanofibers that are electrically interconnected, can substantially actuate by changing dimension and or generating a force without the required presence of either a liquid or solid electrolytes. For the purpose of this invention, "nanofibers" are defined as fibers that have smallest lateral of below 1000 nm. Networks of electrically interconnected nanofibers having predominately smallest nanofiber lateral dimensions of either below 100 nm or below 10 nm can be especially useful for different invention embodiments. Nanoribbons are considered to be a specific type of nanofibers.

The electrical drive for these mechanical actuators can be due predominately to electrostatic forces caused by electrical charge injection, predominately magnetic forces generated by current flow, and any combination involving at least one of these processes with other actuation processes. Such other actuation processes can involve radiation generated dimensional changes, thermally generated dimensional changes, and chemically generated dimensional changes.

The achieved benefit of actuation can be force generation, actuator displacement (sometimes called "stroke"), change in actuator material properties as a result of actuation produced dimensional change, or combinations thereof.

While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

A. Actuator Materials, Properties, and Fabrication Processes

The actuator material optimally comprises a network of interconnected conducting nanofibers. Various nanofibers and nanofiber syntheses and fabrication processes can be usefully deployed, as can be mixtures of different nanofiber types and mixtures of nanofibers with other materials.

Undensified and densified carbon nanofiber aerogel sheets provide especially useful actuator materials of invention embodiments, as described U.S. Provisional Patent Application Ser. No. 61/089,275, filed Aug. 15, 2008, and in A. E. Aliev et al., *Science* 323, 1575-1578 (2009).

Various types of carbon nanotube networks can be deployed for embodiments of the present invention. One type of carbon nanotube networks are aerogel sheets that can be drawn from forests of carbon multiwalled nanotubes (MWNTs), carbon few-walled nanotubes (FWNTs), carbon single-walled nanotubes (SWNTs), and forests comprising these and other nanotube types. For example, MWNT sheets made by the forest draw process typically have a density of ~1.5 mg/cm$^3$, an areal density in the sheet plane of ~1 to ~3 μg/cm$^2$, and a thickness of ~20 μm [M. Zhang et al., *Science* 309, 1215-1219 (2005)]. Despite this low density, these carbon aerogel sheets have higher gravimetric strength than steel plate and the Mylar and Kapton films that have been used for ultra-light airplanes. Liquid-based densification of the aerogel sheets can decrease sheet thickness ~400 fold to typically 50 nm, which is useful for decreasing actuator volume.

These nanotube aerogel sheets can be drawn from forests at above 2 m/s and a gram of sheet could cover over 30 m$^2$. The aerogel sheets act as a low modulus rubber when stretched in the sheet width direction by up to 300%, which is good for accommodating large stroke actuation when large stroke actuation is desirable. FIG. 1 shows sheet stack assembly by wrapping a sheet on a rotating mandrel 102 (using rotary motor 103) as the sheet is fabricated by draw from a nanotube forest 101. FWNT and SWNT forests can be similarly processed into nanofiber sheets and yarns [X. Zhang et al., *Advanced Materials* 19, 4198-4201 (2007)].

In addition to typical SWNTs or FWNTs that have circular or approximately circular cross-sections, SWNTs or FWNTs that have sufficiently large diameters to collapse into ribbons are also useful for invention embodiments. Such collapsed nanotubes can be provided by chemical vapor deposition in the gas phase and subsequently assembled as oriented sheets having arbitrarily small thicknesses [U.S. Patent Application Publ. No. 2005/006801 A1, publication Jan. 13, 2005, I. A. Kinlock, Y. Li, A. H. Windle, and S. L. Cash]. Also, chemical vapor deposition in the gas phase of either MWNTs, FWNTs, or SWNTs, and subsequently assembly as oriented sheets having arbitrarily small thicknesses has been described [Y. Li, I. A. Kinlock, A. H. Windle, *Science* 304, 276-278 (2004)]. These sheet fabrication methods, where the nanotubes (or other nanofibers) are grown by CVD in the gas phase, are useful for producing fabricated materials for invention embodiments.

Various nanofiber types and fabrication methods can be deployed for invention embodiments, especially since useful actuation can be obtained using nanofiber actuator materials having various network arrangements of nanofibers. While the predominate component of the nanofibers in the network should have a nanofiber thickness of less that about 1000 nm in the thinnest direction of the nanofiber cross-section, smaller thicknesses of below about 100 nm in the thinnest direction are more preferred. Also, while non-conducting fibers can also be present in the actuating material, a network of electronically interconnected electronically connected nanofibers should be present.

Nanofibers need not contain carbon in order to be useful for embodiment of the invention, and various processes are well known in the art for making electronically conducting nanofibers that are not carbon based. Some examples include: the growth of superconducting $MgB_2$ nanowires by the reaction of single crystal B nanowires with the vapor of Mg [Y. Wu, B. Messer, P. Yang, *Advanced Materials* 13, 1487-1489 (2001)]; the growth of superconducting lead nanowires by the thermal decomposition of lead acetate in ethylene glycol [Y. Wu et al., *Nano Letters* 3, 1163-1166 (2003)], and the synthesis of lead nanowires by templating lead within channels in porous membranes or steps on silicon substrates. The latter methods and various other methods of producing metallic nanowires of types suitable for the practice of invention embodiments are described in Wu et al., *Nano Letters* 3, 1163-1166 (2003). Y. Li and coworkers have shown how to make bismuth nanotubes [N. Li et al., *J. Am. Chem. Soc.* 123, 9904-9905 (2001)].

Insulating or poorly conducting nanofibers are also suitable for embodiments of the invention as long as these nanofibers are made conducting, such as by deposition of a nanothick metal coating on the non-conducting or poorly conducting nanofibers. This deposition can be made either before or after fabrication of the nanofibers into a conducting network.

Nanofibers that are scrolled are also useful for embodiments of the invention. These nanoscrolls can be individual sheets or a thin stack of sheets of a layered material that automatically wind to make a scroll, which is structurally analogous to a jelly roll. Almost any sheet-like material can self-assemble into scrolls—as long as the lateral sheet dimension is sufficiently large that the energy gain from binding between layers of the scroll can compensate for the elastic energy cost of forming the scroll. Nanofiber scrolls of invention embodiments can be made by simply exfoliating materials like graphite. Various methods of synthesizing nanoscrolls of a host of layered materials are known, and these methods can be used for the practice of present invention embodiments [see L. M. Viculis, J. J. Mack, R. B. Kaner, *Science* 299, 1361-1361 (2003); Z. L. Wang, *Advanced Materials* 15, 432-436 (2003); X. Wang et al., *Advanced Materials* 14, 1732-1735 (2002); W. L. Hughes and Z. L. Wang, *Applied Physics Letters* 82, 2886-2888 (2003); J. W. Liu et al., *Journal of Physical Chemistry* B 107, 6329-6332 (2003); and Y. B. Li, Y. Bando, D. Golberg, *Chemical Physics Letters* 375, 102-105 (2003)].

Nanofibers that are ribbons of graphene sheets are especially useful for the electrically conducting network of actuating electrodes for embodiments of the invention. One preferred method for making these graphene ribbons as high aspect ratio nanofibers is by unzipping carbon nanotubes [D. M. Kosynkin et al., *Nature* 458, 872-876 (2009)].

Nanofibers of the $Nb_3Sn$ superconductor and the $MgB_2$ superconductor (which has a superconducting transition temperature of about 39 K) are preferred as nanofibers for current-driven actuator materials of embodiments of the invention that can be efficiently operated at low temperatures [see Y. Wu, B. Messer, P. Yang, *Advanced Materials* 13, 1487-1489 (2001) (where the growth of superconducting $MgB_2$ nanowires by the reaction of single crystal B nanowires with the vapor of Mg is described)]. Such superconducting nanofibers can be especially useful for current-driven actuators of invention embodiments, wherein magnetic-field-based attraction between nanowires carrying current in about the same direction is the principal origin of actuation.

Nanofibers of electronically conducting organic polymers are also especially useful for embodiments of the invention. Conducting polymers that act as highly elastic rubbers can be more especially useful, since low modulus enhances electrical to mechanical energy conversion efficiency (and the reverse process of converting mechanical energy to electrical energy). Some examples of such elastomeric conducting polymers are polypyrrole, polyaniline, or polythiophene that contain sulfonated poly(styrene-ethylene/butylene-styrene) as a polymeric dopant [China Patent No. 1410486A (2003), to Q. Xue, N. Xu, W. Chen, and Y. Yu] and polyaniline doped with the di-2-butoxy-2-ethoxy-ethyl ester of sulfosuccinic acid [W. Takahima et al., *Sensors and Actuators* B 99, 601-607 (2004)]. Other examples of elastomeric conducting polymers that are useful for invention embodiments are electron-acceptor-doped block copolymers of poly(3-hexylthiophene) and polyisoprene.

It has been found that the carbon nanotube aerogel sheets fabricated by forest draw have a number of surprising and useful observed actuator characteristics. It has been found that these characteristics can be related to sheet properties for generically determining those sheet properties that are especially useful for actuation. To describe these properties, and for later describing sheet actuation (as well as actuator for narrow width sheets, which we can optionally refer to as ribbons), the actuating sheet dimension in the sheet draw direction from the nanotube forest is defined as the "sheet length (L)," and the orthogonal sheet dimensions are defined as the "sheet width (W)" and the "sheet thickness (H)," which have initial values $L_o$, $W_o$, and $H_o$ prior to actuation. This use of orthogonal dimensions is useful for the rectangular sheets and sheet strips that are most commonly used for invention embodiments. However, we more generally use the term sheet to denote an article that has arbitrary in-plane shape. For example, the spinning wedge that results from twist-based spinning of a yarn for a nanotube forest [M. Zhang, K. R. Atkinson, R. H. Baughman, *Science* 306, 1358-1361 (2004)] satisfies the present definition of a sheet. Also, for example, a sheet can be non-planar (and even coiled or fashioned into a cylinder) and still satisfy the present definition of sheet. Similar considerations pertain to the term "sheet strip".

While these surprising properties were initially discovered for carbon nanotube sheets produced from carbon nanotube forests, these properties are largely a consequence of the structure of the conducting nanofiber network, and an equivalent network structure can be obtained for various nanofiber types and differing sheet fabrication methods.

The first surprising property is that these sheets show rubber-like elasticity for a stretch applied in the width direction that can exceed 300%. The consequence of this large elasticity is that giant stoke actuation can be reversibly accommodated over many cycles of actuation. Second, and even more surprising, this rubber-like elasticity has largely an enthalpic origin. This enthalpic elasticity contrasts with the largely entropic origin of elasticity for ordinary rubbers. While the Young's modulus for ordinary rubbers increases very approximately in proportion to absolute temperature, the enthalpic origin of rubber elasticity for these nanotube sheets is largely independent of temperature. This enables giant actuator strokes (for a given applied potential) over an unprecedented temperature range (near 0 K to above 1900 K, which is higher than the melting point of steel).

Additionally, it was surprisingly discovered that charge injection within a carbon nanotube aerogel sheet to produce actuation (and correspondingly electrostatically-generated tensile forces in all sheet directions) causes giant expansion in sheet width and sheet thickness directions, and a smaller percent contraction in the sheet length direction. Subsequent investigation of the origin of this length-direction contraction showed that it originated from giant positive elastic compliances that couple electrostatically generated tensile stresses in the width ($\sigma_W$) and length directions ($\sigma_L$) to strain in the sheet length direction ($\epsilon_L$). More specifically, the elastic compliances $S_{LL}$, $S_{LW}$, and $S_{LH}$ provide a length direction strain of $\epsilon_L = S_{LL}\sigma_L + S_{LW}\sigma_W + S_{LH}\sigma_H$. Since diagonal terms like $S_{LL}$ must be positive as a requirement for structural stability and length direction stress ($\sigma_L$) must be positive when $\sigma_L$ is electrostatically generated, the first term would produce an expansion in the length direction. The contributions from the other terms (with $S_{LW}$ and $S_{LH}$ negative, corresponding to positive Poisson's ratios) are sufficient to reverse the sign of $\epsilon_L$. Support for this is provided by the giant positive observed Poisson's ratio in width ($v_{LW}$) and thickness ($v_{LH}$) directions for length direction stretch: $v_{LW} = -S_{LW}/S_{LL}$ and $v_{LH} = -S_{LH}/S_{LL}$ (see Section E, below).

The structural morphology of the force-drawn carbon nanotube aerogel sheets is especially useful for embodiments of the invention, and this and other equivalently useful nanofiber network morphologies are obtainable for diverse types of other nanofibers. This nanofiber network morphology enables nanoscale amplifier effects, due to giant Poisson's ratios, and highly anisotropic actuation. Hence, while experimental data is presented largely for undensified and densified carbon nanotube sheets, description of this structure enables one skilled in the art to practice embodiments of the invention for diverse types of nanofibers.

Figure 2:
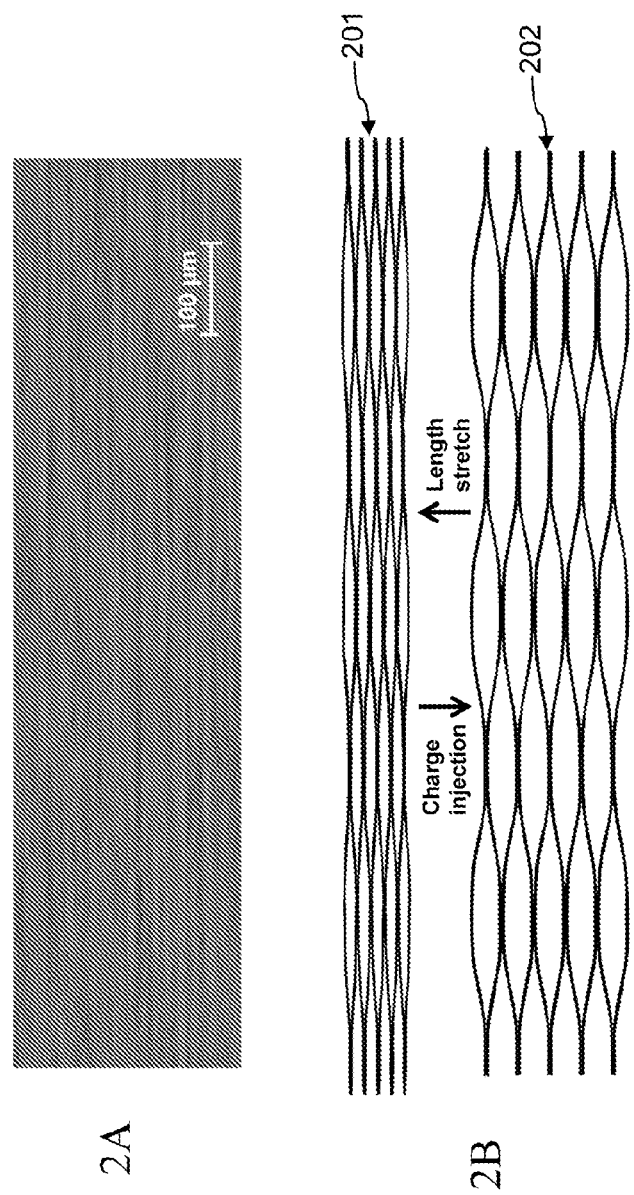
FIG. 2A is an optical micrograph of a nanotube sheet actuated at 5 kV, showing the slit-like pores that become pronounced at this extreme voltage.
FIG. 2B illustrates a simplistic schematic model for the pore structure that exists on both microscopic and submicroscopic scales for the nanotube sheets. The top part 201 and the bottom part 202 of FIG. 2B illustrate extreme states for the width of the pore structure and indicate the direction of structure change upon charge injection or the application of a tensile strain in the length direction.

The optical micrograph of FIG. 2A for a highly laterally extended actuated state (and schematic representations illustrated in FIG. 2B for the effects of charge-injection driven actuation and mechanical stretch in the draw direction) show the existence of a pore structure that is highly elongated in the nanotube orientation direction (the sheet draw direction). Opening and partially closing these pores (which occur in both nano- and micro-scales) explains both the highly anisotropic nature of actuation and the giant Poisson's ratios discussed in Section E, below.

On the near nanoscale, the sheets can be viewed as a self-woven textile, where lateral forking of a nanotube bundle and subsequent recombination of these forks with other bundles provides structural integrity in the nanotube sheet width and thickness directions, which provides this morphology.

This structure is mechanically equivalent to a nearly collapsed wine rack—a small percent elongation in the already elongated length direction (the approximate orientation direction for the nanotube sheets) causes a much larger percent contraction in the direction of collapse (the equivalent of the nanotube sheet width direction). The nanoscale version of this nearly collapsed wine rack structure can be produced by orienting successive nanofibers layers so that there is a small difference in nanofiber orientation angle between these layers. One method for accomplishing this would be electrostatic spinning of the above mentioned conducting polymer nanofibers (or even non-elastic conducting polymer nanofibers) so that an initial nanofiber orientation is slightly shifted between neighboring layers.

B. Charge Injection Driven Muscles

Actuation predominately results from charge injection as a result of applying a voltage to a nanofiber comprising actuator electrode. This voltage is applied with respect to a counter electrode or an assembly of counter electrodes, which can optionally also be actuating nanofiber electrodes. Alternatively, this voltage can be applied with respect to a ground plane, which can optionally be at an arbitrarily long distance from an actuating electrode.

Unless special methods of embodiments of the invention are employed involving electronic or mechanical resonance, large voltages are required to produce large stroke actuation if the counter electrode (or electrodes) are distant. In such case of large applied voltage, it has been found that an actuating electrode is preferably positively charged. This sign choice can eliminate energy loss from the actuating electrode as a result of electron emission from this electrode.

Use of actuating electrodes (or actuating and non-actuating electrodes) that are in close proximity can dramatically decrease the applied voltage needed for large stroke actuation by increasing inter-electrode capacitance, and thereby decreasing the voltage required for a given amount of charge injection. Since close proximity of electrodes having opposite injected charge generates electrostatic forces between them, it is useful in some embodiments of the invention to provide electrode arrays in which inter-electrode forces on an actuating nanofiber electrode are balanced. For example, a positive actuating nanotube sheet electrode can be optionally placed midway between two rigid metal plate electrodes that are connected to the same negative output of the power supply. This is an example of a preferred actuator comprising at least three electrodes, wherein at least one of the electrodes is an actuating electrode and all three electrodes do not have the same applied voltage at all times during actuation. This arrangement provides the desired benefit of minimizing translational displacement of the actuating electrode as a result of interelectrode electrostatic interactions. If should be understood that different actuating electrodes in an actuator can have different applied voltages, and can separately provide useful actuation function (like accomplishing mechanical work).

Nanofiber aerogels are especially useful for invention embodiments as networks of electrically interconnected nanofibers that provide actuation. Carbon nanotubes are among preferred nanofiber types. Carbon nanotube networks that comprise either over 50 wt. % MWNTs or over a 50 wt. % of either FWNTs, SWNTs, or a mixture thereof are included in especially preferred nanofiber networks. Preferred means of producing nanofiber aerogels include sheet draw from a nanofiber forest and collection of nanofibers synthesized in the gas phase to form a sheet. Nanofiber sheets or sheet strips that have a nanofiber alignment direction within the sheet plane are especially useful for invention embodiments. Also, aerogels having a density before actuation of less than 10 mg/cm$^3$ are among those aerogels that provide useful performance. Especially useful aerogels are those that can actuate upon charge injection to decrease volumetric density by a factor of at least 2. More especially useful aerogels include those that can actuate upon charge injection to decrease volumetric density by a factor of at least 5. Carbon nanotube aerogels that are enthalpic rubbers are preferred for actuating compositions, since the corresponding weak dependence of elastic modulus on temperature enables large stroke actuation at extreme low and high temperatures (Example 4 and FIGS. 14 and 15A-15C), which can closely approach 0 K and can exceed 1900 K. Since charge-injection-based actuation in the sheet width direction decreases with increasing sheet thickness (Example 3 and FIG. 5A), actuating sheet of this type used for width-direction actuation preferably have a thickness of less than about 200 microns when an aerogel and 500 nm when a densified aerogel. The thickness dimension for the densified aerogel is more preferably less than 100 nm for this type of invention embodiment. Both because increasing sheet thickness and increasing sheet volumetric density decreases width-direction actuation by charge injection, the areal density of the sheet or sheet strip in the sheet or sheet strip plane is preferably less than about 100 μg/cm$^2$. Since length direction nanofiber sheet supports restrict actuation in the width and thickness directions unless these supports are specially constructed (which add to actuator cost) and since the effects of end support constraints on width-direction actuation decreases with the length-to-width ratio of the sheet strips (Example 5 and FIG. 4), the ratio of sheet strip length to width before actuation is preferably at least 10 when very large width-direction actuation is sought.

In the following described experimental results, the counter-electrode to an actuating carbon nanotube sheet electrode is a distant ground plane (at effectively infinity). The nanotube sheets used were drawn from a carbon MWNT forest, as described in M. Zhang, S. Fang et al., *Science* 309, 1215-1219 (2005). Also, the actuating electrode was chosen to be positive with respect to the ground plane, in order to avoid at high voltages the above described energy loss due to electron emission. Unless otherwise indicated the carbon nanotube sheet electrodes used for experiments were produced by draw from a nanotube forest.

Figure 3:
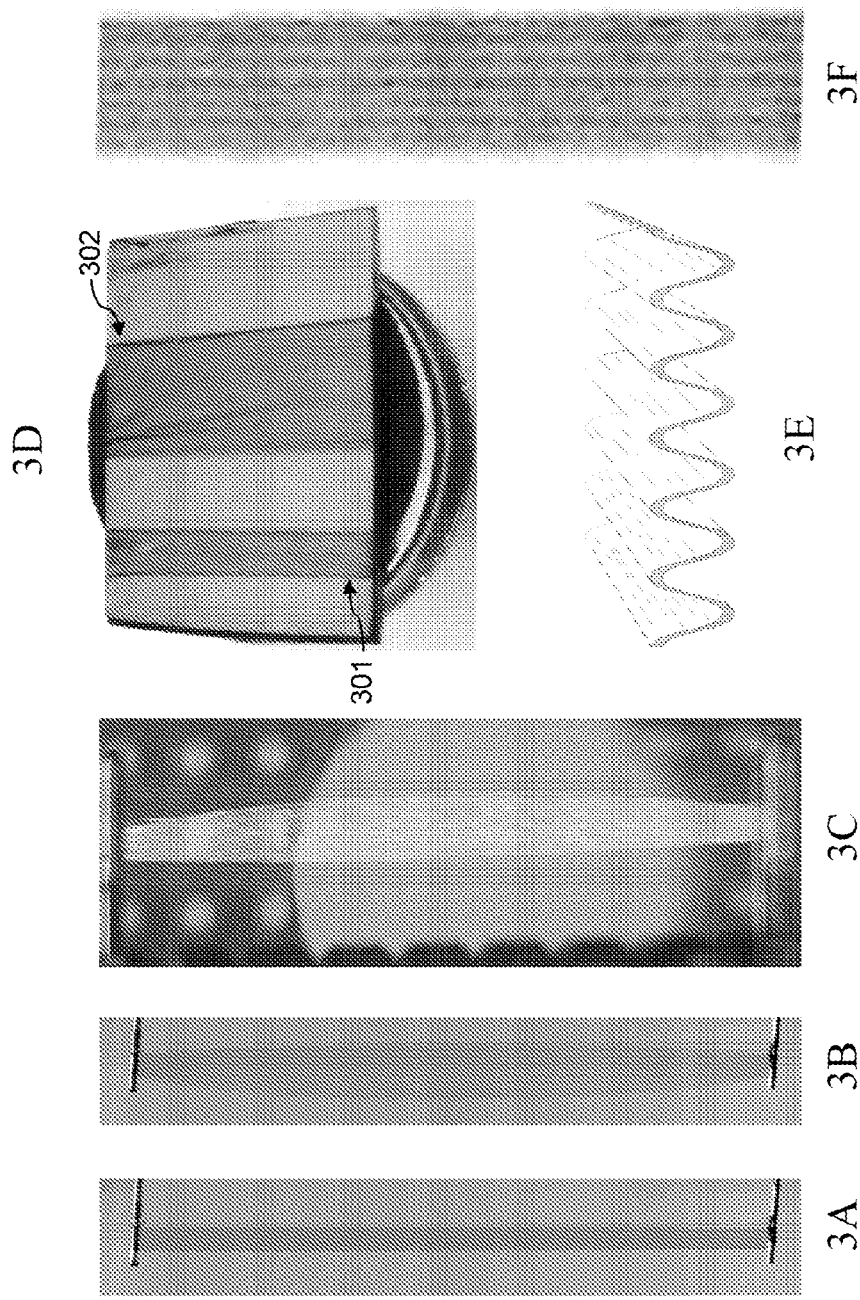
FIGS. 3A-3B are photographs of a carbon MWNT sheet strip before (FIG. 3A) and after (FIG. 3B) actuation at room temperature.
FIG. 3C is a photograph of the actuated state of a sheet strip at 1500 K.
FIG. 3D shows a photograph of otherwise identical nanotube sheet strips that were frozen in un-actuated (301) and actuated (302) states by contact with a surface and subsequent densification.
FIGS. 3E-3F provide a schematic representation (FIG. 3E) and an optical micrograph (FIG. 3F) of the periodic corrugation in the width direction that results from periodic cycling under the inhomogeneous strains caused by sheet strip ballooning when L/W ratio is not high and actuation strains are high.

The photographs of FIGS. 3A-3C demonstrated width-direction actuator strokes of about 220% for carbon MWNT aerogel sheets, as well as large actuation at ambient and at 1500 K. The nanotube sheet strip in FIG. 3A was 50 mm long and 2 mm wide, and the voltage used to obtain the actuated state of FIG. 3B was +5 kV with respect to a distant ground. The photograph of FIG. 3C is for a 25 mm long nanotube sheet strip actuated at 1500 K by applying 3 kV.

The evident "ballooning" in sheet width (FIGS. 3B-3C) was a result of giant actuation and the constraints on width-direction expansion at the supporting rigid Cu wires at the top and bottom of the sheet strip. The consequence of ballooning in the width direction, from 0% at sample grips to about 220% at the center of the nanotube strip for FIG. 3B, was the development of periodic corrugation in the width direction during nanotube sheet cycling (FIGS. 3E-3F). Corrugation formation can be avoided (and ballooning can be minimized) by either increasing the length-to-width ratio of the unactuated sheets or decreasing the applied potential, so that the strains in the width direction become more uniform over sheet length. Decreasing ballooning in sample width by increasing the length-to-width ratio ($L_o/W_o$) also increases the width-direction actuator strain obtained for a given applied voltage, as can be seem in FIG. 4 and Example 5 below. Here and elsewhere in this application, strains in the width and thickness directions were those measured at sample midpoint with respect to supports that constrain actuator stroke.

The photograph of FIG. 3D showed that electrically produced actuation of ~3× can be permanently frozen by laying the electrically actuated (expanded) sheet on a substrate (like the pictured gold-coated Si), and using van der Waals bonding between nanotubes and substrate to prevent return to the initial non-expanded state. The frozen unactuated sheet 301 and actuated sheet 302, which had the same width before actuation, were subsequently densified on the substrate using the absorption and evaporation of ethanol before the photograph was taken. This method freezes actuation strokes in length and width, but not in the sheet thickness direction.

Freezing of the actuated state in three dimensions can be and was accomplished by applying known vapor phase deposition methods (like CVD or plasma enhanced CVD of nano-thick layers of metal, oxide, or polymer to free-standing actuated carbon nanotube aerogel sheets). Both generic approaches for freezing electrically driven actuation enable tuning areal density and related properties for transparent electrode and other applications.

Figure 6:
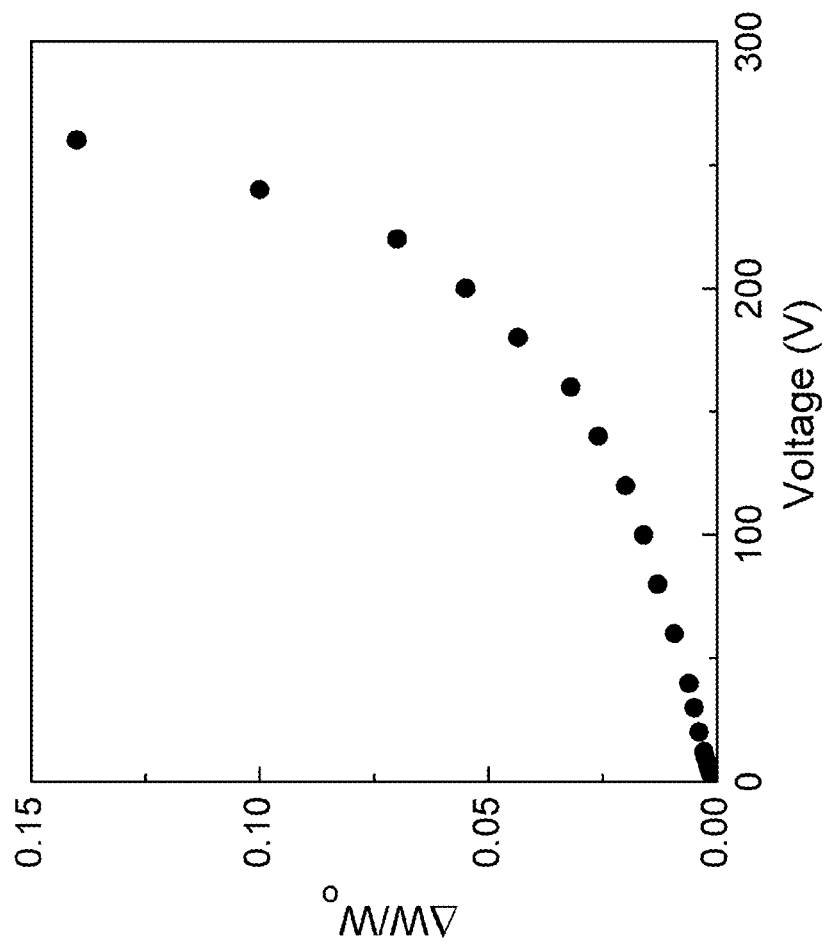
FIG. 6 is a graph that shows measured width-direction actuator stroke ($\Delta W/W_o$) versus applied dc voltage for a 25 mm long by 1.77 mm wide single undensified MWNT aerogel sheet.

The observed voltage dependence of actuator stroke in the width direction at length center, normalized to the initial width to provide generated strain $\in_w = \Delta W/W_o$, is shown in FIGS. 5A-5B for single and stacked aerogel sheets having the same $L_o/W_o$ ratio. While $\in_w$ increased approximately quadratically with applied voltage V, a crossover occurred at higher voltages to a weaker dependence, approximately $V^{2/3}$. At relatively low applied voltage (260 V), the observed width-direction actuation (FIG. 6 and Example 7, below) was 14% for a single layer sheet strip having $L_o/W_o=13.9$. The decrease in width-direction stroke by a factor of about 3.7 upon densification of an eight sheet stack (FIG. 5A) was consistent with increase in nanotube-nanotube interconnects and the corresponding increase in specific stiffness as a result of densification. The FIG. 5A data on the voltage dependence of $\in_w$ can be reduced to a universal curve (FIG. 5B) that was independent of the number N of stacked sheets (between N=1 and 8), by plotting $\in_w$ versus $V^2 S_N$, where $S_N = (N^{-1}-R)/(1-R)$ and where R is a fitting parameter (0.095).

Figure 4:
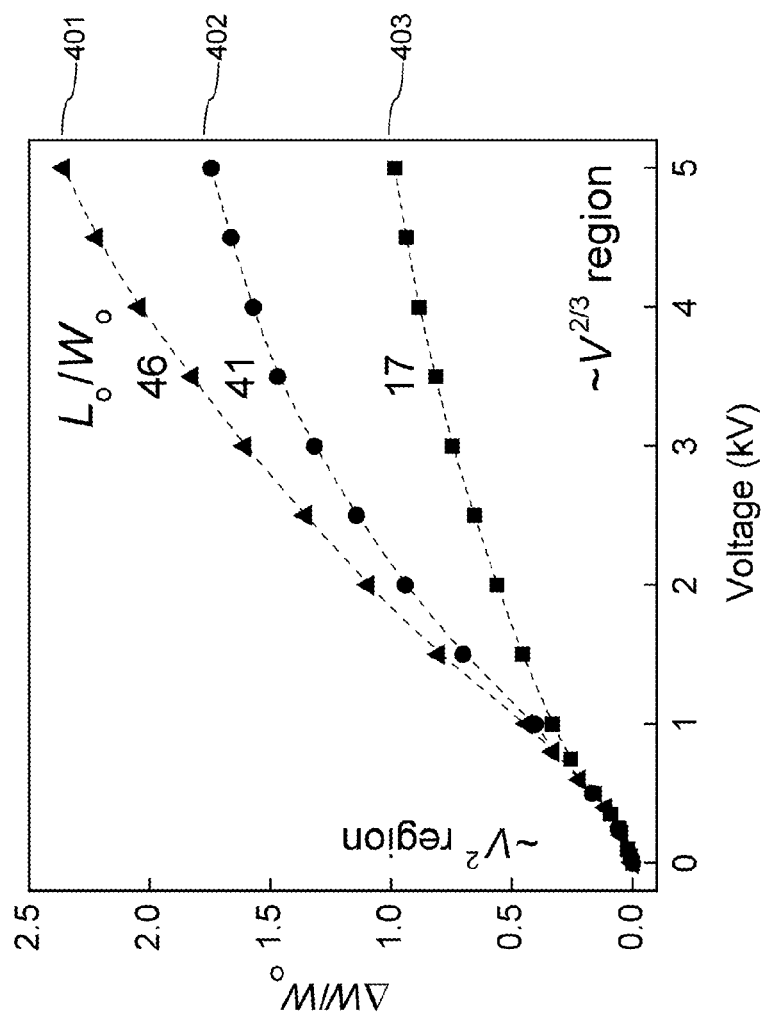
FIG. 4 is a graph that shows measured width-direction actuation strain ($\Delta W/W_o$) as a function of applied voltage for single undensified MWNT sheets having different $L_o/W_o$ ratios. The sheets were held by rigid length-direction supports, which maintain constant sheet length and constant sheet width and thickness at the supports. Actuation strain at a particular voltage increases with increasing $L_o/W_o$, as does the voltage range where transition occurs between $\sim V^2$ and $\sim V^{2/3}$ dependencies for $\Delta W/W_o$.

This crossover in the voltage dependence of width-direction actuation from $\sim V^2$ to $\sim V^{2/3}$ in FIG. 4 and FIGS. 5A-5B resulted from ballooning caused by end clamping. In this geometry, width-direction expansion required stretch in the high modulus nanotube orientation direction and this elongation provided the dominant elastic energy term at the large strokes produced at high applied voltages. The charge-injection-generated force needed to provide strain $\in_w$ is approximately $F = A\in_w + B\in_w^3$, where A and B are coefficients proportional to elastic stiffness in the width and nanotube orientation directions, respectively. The $\in_w$ term is the ordinary linear dependence of force on elastic strain in the width direction. The $\in_w^3$ term arises from combination of the $\in_w^2$ dependence of fractional elongation of the bowed nanotubes and the $\in_w$ dependence of the projection of the resulting restoring force onto the width direction. Since the electrostatic repulsive force F producing $\in_w$ depends quadratically on injected charge and the injected charge is CV, where C is the sheet capacitance, the combination of linear and cubic terms in $\in_w$ for F leads to the correct prediction that $\in_w$ increases as $\sim V^2$ when $\in_w$ is small and as $\sim V^{2/3}$ when $\in_w$ is large. The cross-over voltage between these strain dependencies and the $\in_w$ obtained at high voltage should increase with increasing $L_o/W_o$, which has been experimentally confirmed (FIG. 4).

Figure 7:
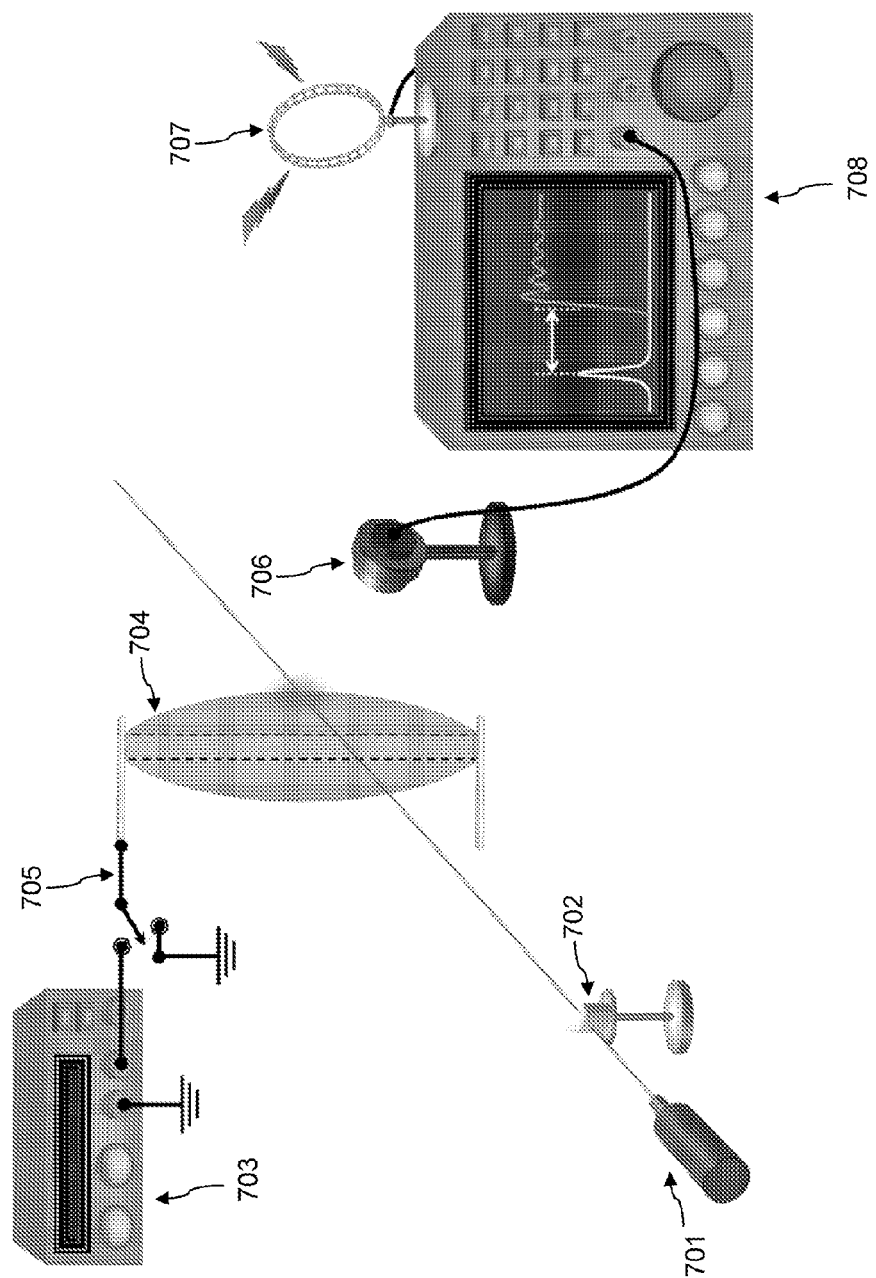
FIG. 7 is an illustration that shows the apparatus used for determining width-direction actuation rate by measuring the delay time (τ) between an antennae-detected pulse from closing a switch that connects the nanotube sheet to the power supply, and subsequent movement of the sheet edge to intersect a laser beam. The image on the two channel oscilloscope illustrates the time delay τ between trigger signal and subsequent electrical signal from the photodetector.

The average actuation rate in the width direction was determined in air for a high aspect ratio single sheet ($L_o/W_o=36$) by measuring the time delay (5 ms) between applying 5 kV to the nanotube sheet and subsequent 180% width expansion (FIG. 7 and Example 9, below). This average actuation rate was a remarkable $3.7 \times 10^4$%/s, as compared with the maximum 20%/s achieved rate for other electrically driven carbon nanotube yarn or sheet actuators and the 50%/s maximum rate of natural muscle [J. D. W. Madden et al., *IEEE J. of Oceanic Eng.* 29, 706-728 (2004)]. A comparable average actuation rate ($3.4 \times 10^4$%/s) was obtained for artificial muscles based on silicon elastomers, but this rate was obtained for electrical drive at resonant frequency where the actuator stroke was about 12% [J. D. W. Madden et al., *IEEE J. of Oceanic Eng.* 29, 706-728 (2004), R. Pelrine, R. Kornbluh, Q. Pei, J. Joseph, *Science* 287, 836-839 (2000)].

Figure 8A:
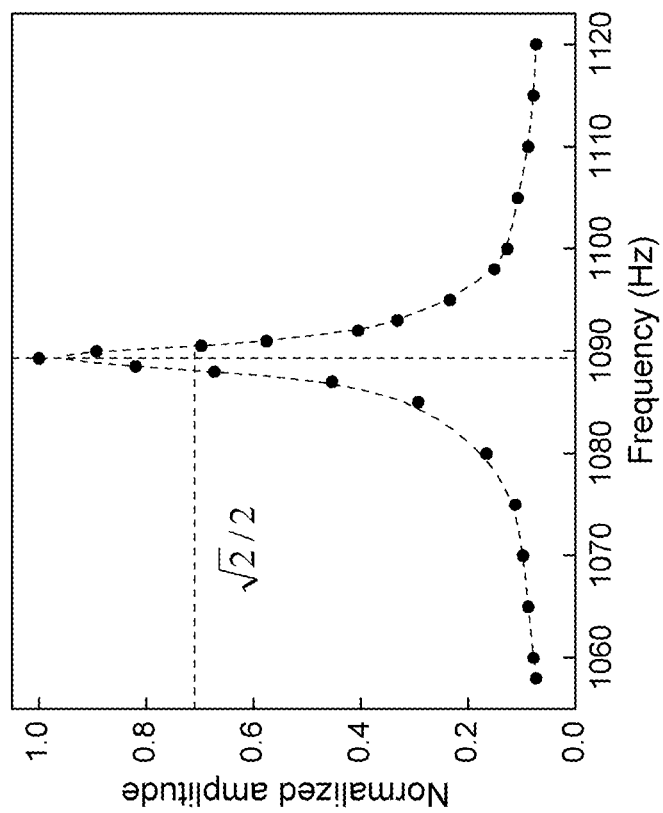
FIG. 8A is a graph that shows measured results obtained for electrically driven width-direction resonant actuation in vacuum for a 25 mm long by 1.8 mm wide undensified single MWNT aerogel sheet.

Resonant actuation in vacuum caused large strokes in the width direction at low applied voltages because of a surprisingly high observed quality factor Q (FIG. 8A and Example 10, below). Applying 1 $V_{RMS}$ (Root Mean Square voltage) ac drive voltage to a 25 mm long by 1.8 mm wide single sheet resulted in a resonant frequency of 1089 Hz and a Q of 455, which dramatically decreased (FIGS. 9A-9B and Example 11, below) when air was introduced. The data of FIGS. 9A-9B and Example 11 on the sensitivity of mechanical loss and resonant frequency on gas pressure indicated that resonantly driven carbon nanotube sheet actuators can be used as gas pressure sensors.

Figure 10:
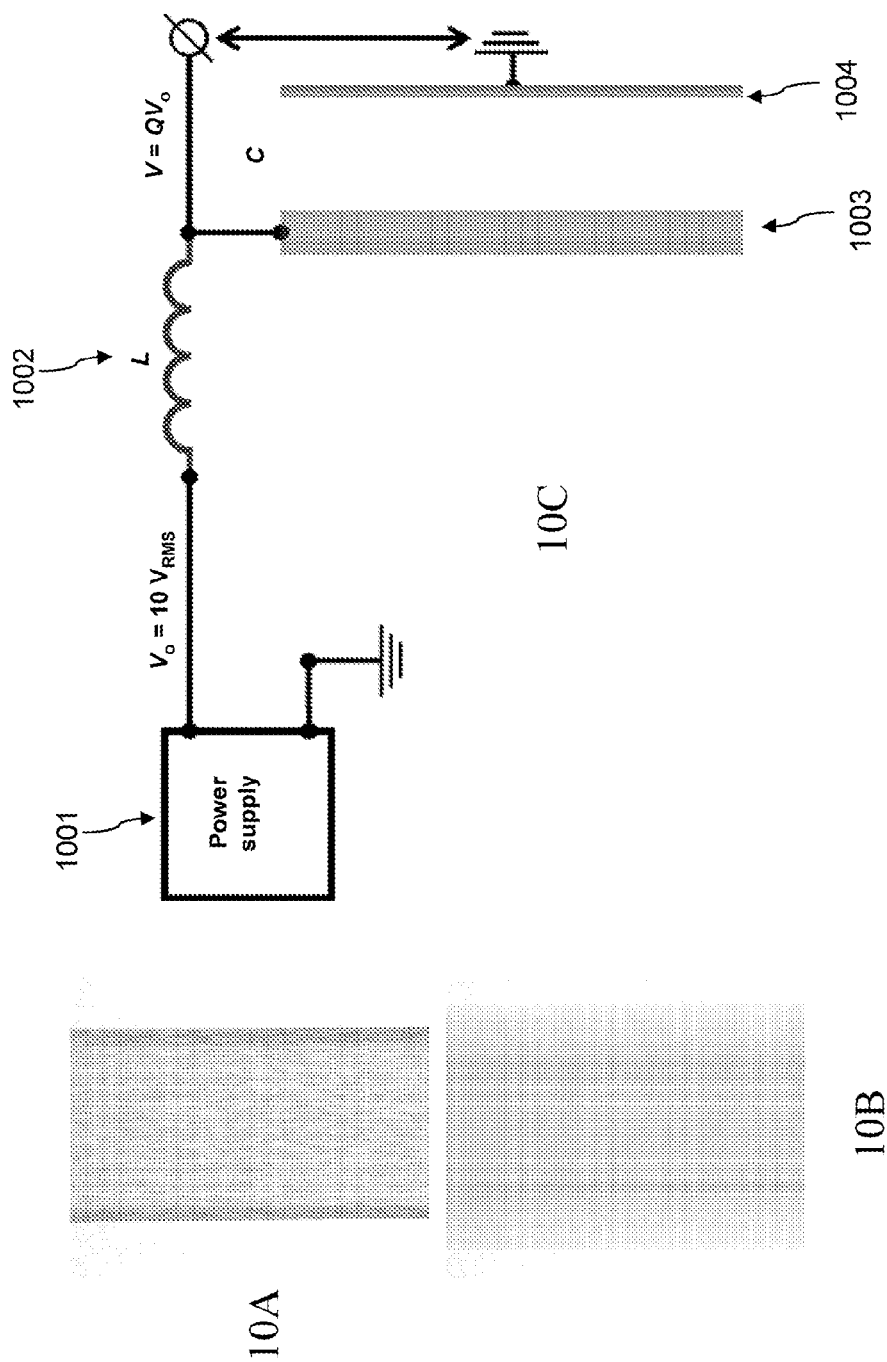
FIGS. 10A-10B are photographs of a segment from a single nanotube sheet strip before (FIG. 10A) and during (FIG. 10B) width-direction resonant actuation driven at 1100 Hz in vacuum. The ac drive voltage was $V_o$=10 $V_{RMS}$, which was amplified 15 fold by placing a 2.4 H inductor in series between the power supply and nanotube sheet to provide a LC circuit that resonated at the mechanical resonant frequency of the sheet. Sheet overlap close to sheet edges was retained for the 25 mm long by 2.2 mm wide sheet strip, so that the locations of these edges become visible at opposite extremes of sheet width actuation.
FIG. 10C shows the equivalent LC circuit for the experiment of FIGS. 10A-10B, where L is the inductance and C is the capacitance, including cable capacitance, with respect to distant ground.

The high mechanical quality factor in vacuum, as well as the high quality factor for electronic resonance (due to the largely capacitive nature of electronic load of nanotube sheet and cables) enabled an observed ±30% oscillatory actuation to be driven at high frequency by a 10 $V_{RMS}$ alternating current power supply (FIGS. 10A-10C and Example 12, below). It is innovative to place a small inductor coil between the power supply and the nanotube sheet (FIG. 10C), where the inductance of the coil and the capacitance of the sheet and associated leads provide an electronic resonant frequency that is close to the mechanical resonant frequency of the nanotube sheet. The electronic resonance increased the 10 $V_{RMS}$ voltage applied to the inductor to a measured 150 $V_{RMS}$, which combined with mechanical resonance enhancement to provide this ±30% oscillation at 1100 Hz.

Figure 11:
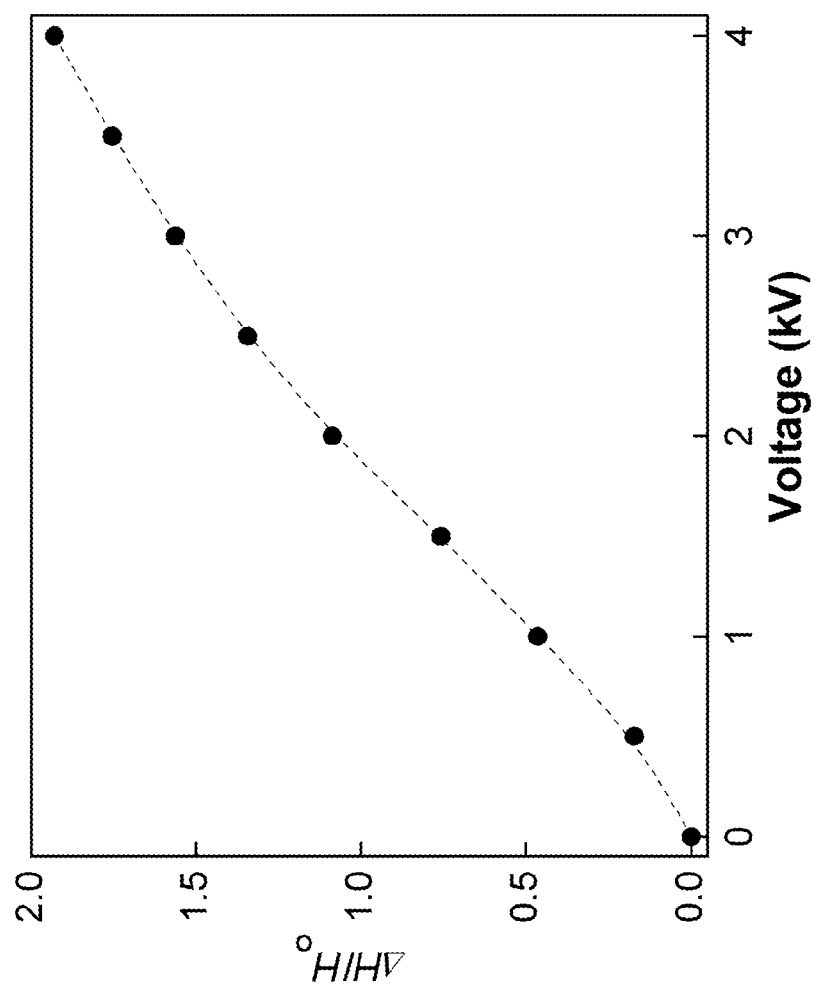
FIG. 11 is a graph that shows measured actuation generated thickness-direction strain versus applied voltage for an eight-layer undensified MWNT sheet strip with the above $L_o$ and $W_o$ of FIGS. 5A-5B and $H_o$=0.3 mm.
Figure 12B:
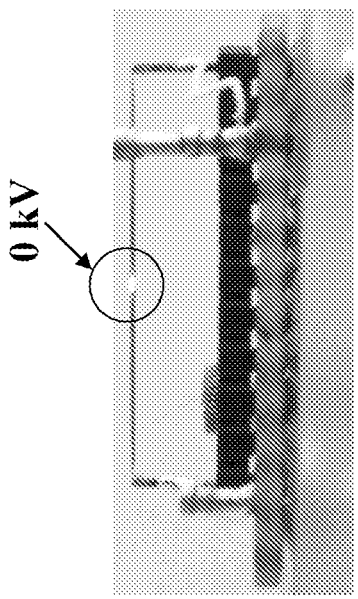
FIGS. 12A-12B are edge-view photographs of the sheet strip in the sample jig before (FIG. 12A) and after (FIG. 12B) actuation, showing at midpoint the laser beam used for thickness measurement.
Figure 12A:
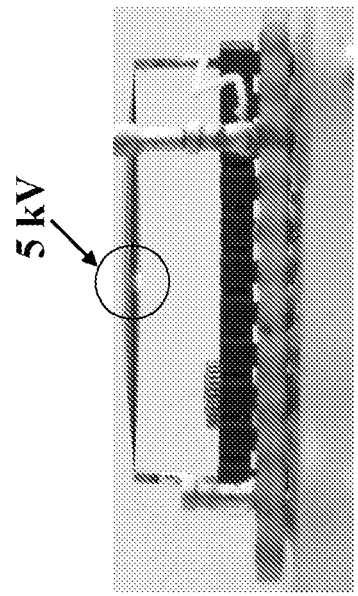

Charge-induced actuation in the carbon nanotube sheet thickness direction is much like that for sheet width: actuator strokes in the thickness direction are also giant (~200%) and the voltage dependence of this actuation again switches from approximately a $V^2$ dependence to close to a $V^{2/3}$ dependence as applied voltage increases (as shown in FIG. 11). A likely reason for this similarity in actuator stroke for sheet thickness and width directions is the approximate structural equivalence of these directions suggested by x-ray diffraction measurements. FIGS. 12A-12B show photographs of the initial thickness (FIG. 12A) and the thickness after actuation (FIG. 12B) at 5 kV potential.

Figure 13B:
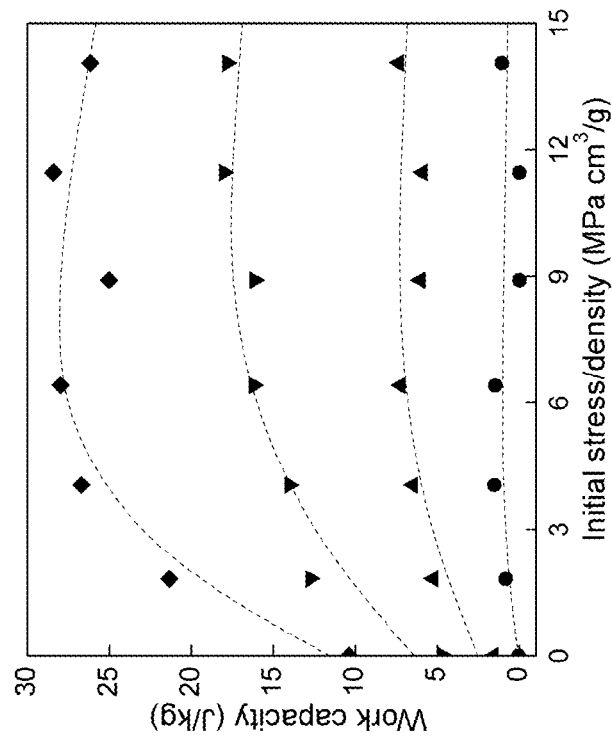
FIG. 13B is a graph that provides corresponding gravimetric work capacity as a function of initially applied density-normalized stress for the experiment and different applied voltages shown in FIG. 13A.

Large-stroke actuation by expansion in sheet width during charge injection was accompanied by contraction of a few percent in sheet length (FIG. 13A and Example 6), where modulus and strength were much higher than for other directions. Length direction actuation generated an isometric specific stress of up to 4.0 MPa cm$^3$/g (corresponding to the data point for $\Delta L/L_o=0$ and 1.6 kV in FIG. 13A). Since electrostatically generated stress is proportional to 1/H, densification of the sheet by decrease in sheet thickness H leaves the isometric specific stress unchanged. Hence, a densified sheet strip with a density of 0.8 g/cm$^3$ has an isometric stress generation capability of 3.2 MPa, which is about 32-fold higher than the maximum sustainable stress generation capability of natural skeletal muscle [J. D. W. Madden et al., *IEEE J. of Oceanic Eng.* 29, 706 (2004)]. The actuator stroke for a specified change in applied potential decreases with increasing initially applied stress, since the Young's modulus increases with strain, so the specific work per cycle reaches a plateau, where there is little sensitivity to the initially applied stress. The maximum achieved work per cycle (as shown in FIG. 13B) is ~30 J/kg, compared with the maximum capability of ~40 J/kg for natural muscle [J. D. W. Madden et al., *IEEE J. of Oceanic Eng.* 29, 706-728 (2004)].

Figure 14:
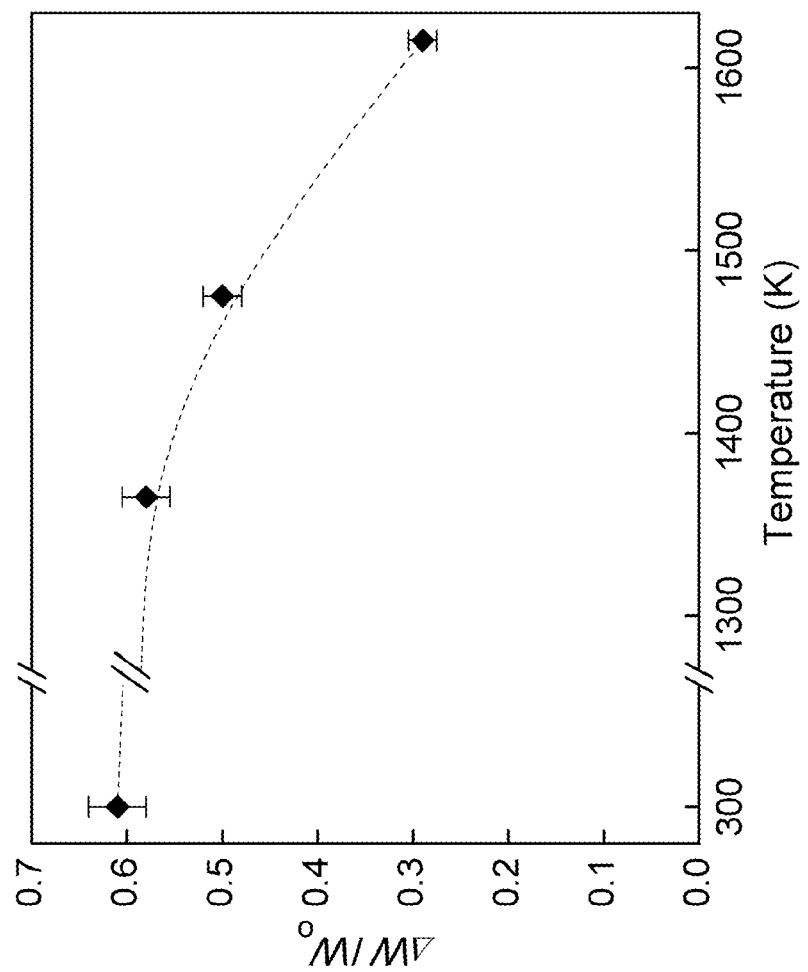
FIG. 14 is a graph that shows measured width-direction actuator strain for a single undensified nanotube sheet strip (25 mm long by 1 mm wide) on switching between 0 and 3 kV at the indicated temperatures. The results are for a length-end supported nanotube sheet, measurements of $\Delta W/W_o$ were made midway between the supports, and the dashed line is a guide for the eye.
Figure 15:
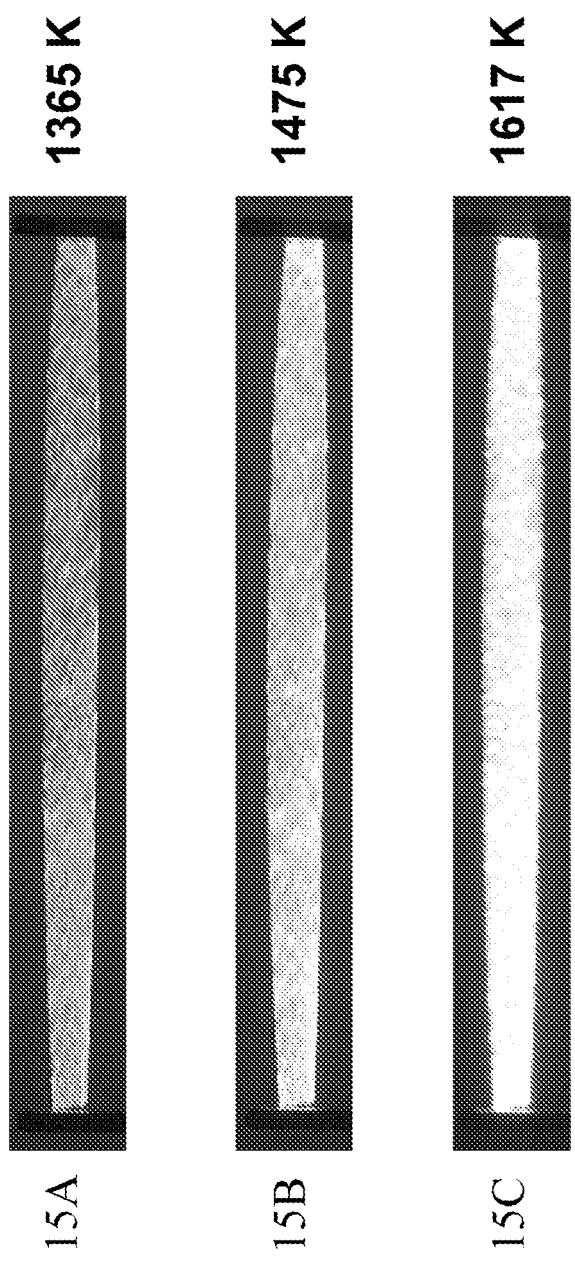
FIGS. 15A-15C are pictures of the actuated sheet of FIG. 14 at temperatures (1365 K, 1475 K, and 1617 K, respectively), where the sheet was so hot that it was incandescent.

The data in FIG. 14 and Example 4 showed that width-direction actuator stroke does not significantly change upon increasing temperature from 300 to 1365 K by resistively heating the sample. Considering the high temperature changes and the possibility that permanent modulus changes will occur because of irreversible annealing, it is also surprising that the nanotube sheets can be repeatedly cycled between 300 K and at least 1500 K without causing significant change in actuation at either temperature. Also, no change in actuator stroke was observed in going from 300 K to the lowest observation temperature (80 K). FIGS. 15A-15C provide pictures of the actuated sheet of FIG. 14 at temperatures where the sheet is incandescent.

Since essentially constant electrostatically generated stresses are acting against the elastic modulus to provide the actuator stroke, the observed near-temperature-invariant actuator stroke indicated that the nanotube sheet modulus was largely temperature independent. This is a signature of enthalpic elasticity, and contrasts with the highly temperature dependent modulus of ordinary entropic rubbers.

Figure 16:
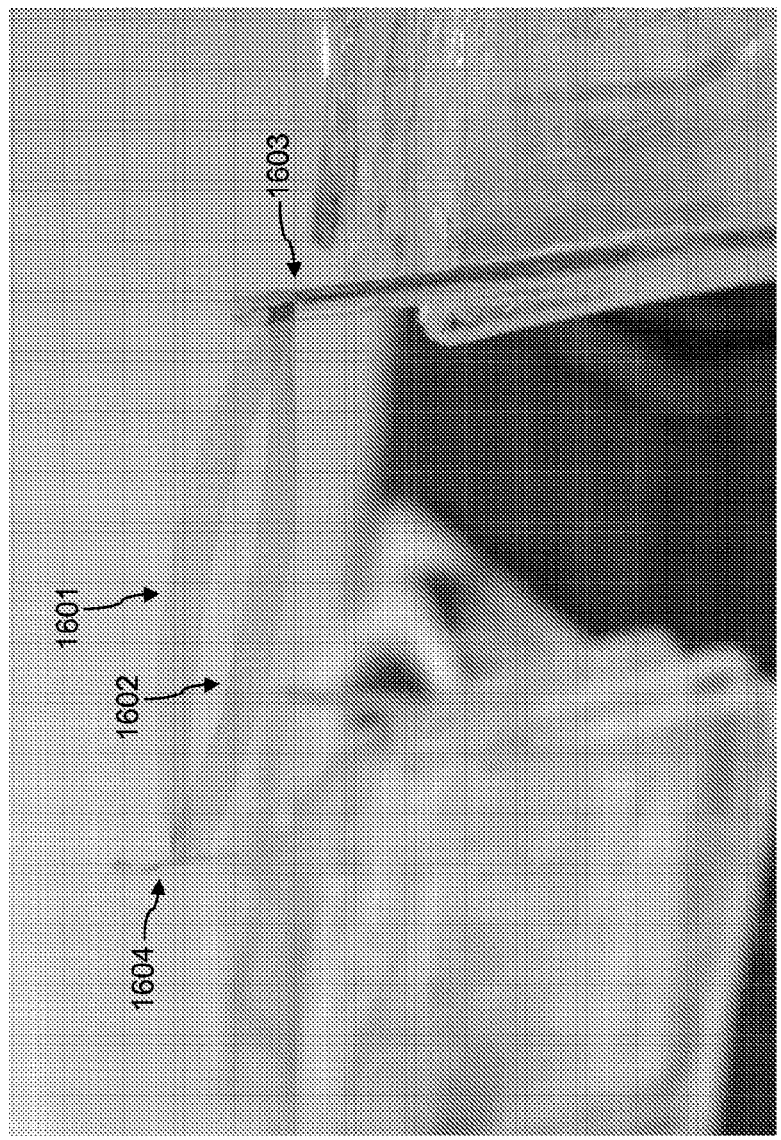
FIG. 16 is a picture that shows actuation due to repulsion between two delaminated MWNT aerogel sheets that were initially in a two sheet stack. The clam shell type of structure (corresponding to delaminated sheets 1601 and 1602) pictured here for the actuated state reverts to a stacked sheet structure (i.e., the laminated structure) when voltage-induced charging is removed during the reverse part of the actuator cycle. This particular type of actuation appears because only one of the wire-based length-direction supports 1603 was rigid. The other length-direction support 1604 was flexible and the displacement of this flexible support enabled the delamination-lamination process that provides actuation.

FIG. 16 pictures actuation due to repulsion between two delaminated MWNT aerogel sheets that were initially in a two sheet stack. The claim shell type of structure (corresponding to delaminated sheets 1601 and 1602) pictured in FIG. 16 for the actuated state reverted to a stacked sheet structure (corresponding to the laminated structure) when voltage-induced charging was removed during the reverse part of the actuator cycle. This particular type of actuation (Example 14) appeared because only one of the length-direction supports 1603 was rigid. The other length-direction support 1604 was flexible and the displacement of this flexible support enabled the delamination-lamination process that provided the actuation. Also, this type of actuation arose because the sheets in the two sheet stack were initially imperfectly laminated together.

C. Charge-Injection Driven Muscles Run in Reverse for Mechanical to Electrical Energy Harvesting These charge-injection driven artificial muscles can be driven in reverse to convert waste mechanical energy to electrical energy. While this can be accomplished using a single carbon nanotube sheet electrode and a counter electrode at a distant ground, it is more efficient to utilize closely positioned electrodes (or arrays of closely positioned electrodes) so as to maximize energy output by maximizing capacitance change obtained by elastic mechanical deformation.

Since the efficiency of mechanical-to-electrical energy conversion can be maximized when the artificial muscle has rubber-like properties (low modulus and high elastic extension), the best known prior-art muscles [R. Pelrine et al., *Science* 287, 836 (2000)] for such conversion operate by the deformation of a rubber sheet dielectric (like silicone rubber) between two parallel, non-confining electrodes that are electrically biased (typically with about 100 V applied potential). Both the dielectric rubber sheet and the nanotube sheet mechanical-to-electrical energy converters use capacitance changes of electrically biased capacitors, and known electronic circuit technology developed for the dielectric rubber converters can be similarly used for the nanofiber sheet converters. However, these technologies are fundamentally different because the dielectric rubber sheets separate deformable electrodes, while the nanofiber sheets are either one or both electrodes for a capacitor. Also, unlike the prior-art muscles used for mechanical energy harvesting, the carbon nanotube muscles can be used for the extreme low and high temperatures relevant for aerospace applications—though protection from air will be needed for continuous service above 700 K.

While no inter-electrode dielectric is required for the nanofiber-based energy converters, it has been found that it is sometimes useful to coat the nanofiber sheets with nano-thick coatings of an insulator (like $TiO_2$ or $SiO_2$), both to prevent possible inter-sheet shorting and to provide atmospheric protection that enables operation in air to as high a temperature as 1000° C. It has further been found that this coating can be accomplished using standard plasma enhanced chemical vapor deposition methods, without fundamentally changing sheet structure or interrupting the required electronic connectivity between nanotube bundles in a sheet.

The capacitance changes needed for device operation can result from mechanical strains applied to carbon nanofiber sheet electrodes in either the low modulus sheet-width direction or the high gravimetric modulus sheet-length direction (the sheet draw direction, which is the nanofiber alignment direction). Simultaneously stretching two parallel carbon nanofiber sheet electrodes (which form a capacitor) though the entire elastic region for the width direction (of about 300%) would enable a 4× increase in capacitance. If the nanofiber capacitor is initially charged in the stretched state, release of this stretch would increase voltage by 4×, which provides the energy output. Likewise, energy harvesting using an applied mechanical strain in the sheet length direction could be used. Since the width-direction Poisson's ratio for a length-direction stretch is giant (about 9.5, see Section E, below), an oscillating stretch in this direction of 2% varies electrode area and inter-electrode capacitance by 8.5%, thereby providing the output voltage.

D. Current Driven Actuation

In some embodiments of the invention, actuation was predominately current driven, instead of electrostatically driven. To cause width-direction actuation of a carbon nanotube aerogel sheet, current was transported in the sheet length direction (the nanotube orientation direction). Magnetic fields established between approximately parallel nanotubes that transport current in approximately the same direction caused the sheet to laterally contract in sheet regions distant from constraining end supports. Each current carrying nanowire generates a magnetic field (according to the Biot-Savart law), and surrounding current-carrying wires experience Lorentz forces as a consequence, which provides the actuation.

Figure 17:
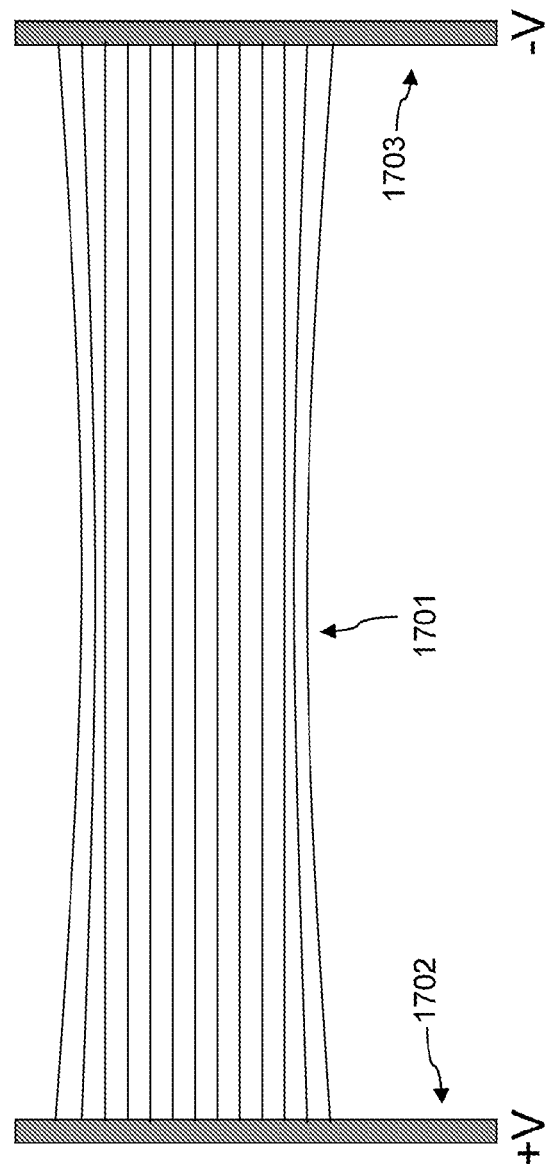
FIG. 17 is an illustration that schematically shows current-driven actuation of a carbon nanotube aerogel sheet. Application of a potential difference 2 V between the two rigid wires 1702 and 1703 that supports aerogel sheet 1701 resulted in current flow through the sheet and resulting contraction in sheet width and thickness as a consequence of Ampère magnetic forces.

FIG. 17 schematically illustrates this current-driven actuation of a carbon nanotube aerogel sheet. Application of a potential difference 2 V between the two rigid wires 1702 and 1703 that support aerogel sheet 1701 resulted in current flow through the sheet and resulting contraction in sheet width and thickness as a consequence of Ampère forces. As described in Example 15 below, this current driven actuation provided up to a 30% contraction in sheet width when current was applied in the nanotube orientation direction of the carbon nanotube aerogel sheet. This large contraction was enabled by the nanoscale separation of bundles in the carbon nanotube sheets (since the magnetically generated forces depend inversely on the inter-bundle separation) and the low modulus of the carbon nanotube sheets in the width direction).

This actuation effect was maximized by having a nanofiber sheet structure where nanofiber bundle diameters are uniform. The reason was that well-separated unusually large bundles can disproportionally carry the current if bundle diameters are not relatively uniform for the length direction. This short circuiting of current flow reduces actuation (for a given overall gravimetric current density), since the force generated by interaction between two wires is inversely proportional to inter-wire separation and proportional to the product of current in the two wires.

The actuation force and resulting stroke in the width direction depended quadratically upon current (I) for actuators that have very high $L_o/W_o$. However, since resistively dissipated power goes as $I^2R$ (where R is the resistance), optimization of electrical conductivity for the nanofiber networks can increase actuator efficiency and increase the maximum useable current (and, therefore, actuator stroke and force generation capabilities). For this reason, highly conducting metal nanowires are quite useful for embodiments of the invention. Also, when low temperature actuation is needed, the nanofibers in the nanofiber network can be selected to be superconducting. Nanofibers of the $Nb_3Sn$ superconductor and the $MgB_2$ superconductor (which has a superconducting transition temperature of about 39 K) are especially utilized as nanofibers for current-driven actuators of embodiments of the invention that are operated below the superconducting transition temperature for the nanofibers.

Carbon nanotube yarns can be made by various methods known in the art, such as spinning from nanotube forests, and these yarns can be used for both charge-injection driven and current driven actuators of invention embodiments. These yarns can also be densified by twist, false-twist, liquid densification, or combinations of these processes [M. Zhang, K. R. Atkinson, R. H. Baughman, *Science* 306, 1358-1361 (2004)]. These yarns are most usefully deployed for actuation in the yarn direction. However, in part because of high stiffness in the yarn direction, actuation-generated strains for densified nanofiber yarns in the yarn direction are small.

Since predominately current-driven actuation by the magnetic mechanism and predominately charge-injection-driven actuation within a nanotube sheet provide oppositely directed actuation orthogonal to a nanotube alignment direction, the overall change in dimensions during actuation can be increased by combining these actuation mechanisms. For example, charge-injection actuation of the nanofiber network in a first part of the actuation cycle and current-driven actuation of the nanofiber network in a second part of an actuation cycle can be used to increase the actuator stroke achieved during the actuator cycle. For this invention embodiment, the nanofiber sheet preferably has a single nanofiber alignment direction within the sheet plane and provision should be made for passing current along this direction.

A second method of current-driven actuation of nanofiber sheets uses the thermoacoustic effect that has been deployed for thermoacoustic sound projectors [L. Xiao et al., *Nano Lett.* 82, 4539-4545 (2008)], where L. Xiao et al. reported (based on measurements using a sensitive laser vibrometer) that "All these results indicate that the CNT thin film does not move during sound generation." In embodiments of the invention, these thermoacoustic sound projectors were transformed into electromechanical actuators that underwent large displacements that provided the ability to accomplish mechanical work. This additional new type of nanofiber actuator was obtained by attaching an electronically conducting nanofiber sheet or sheet stack to a highly flexible substrate that impeded transmission of acoustic waves on the substrate side of the nanofiber sheet. This attachment can optionally use van der Waals bonding provided by physical contact of sheet and substrate and can optionally be on either one side or both sides of the substrate.

Figure 18:
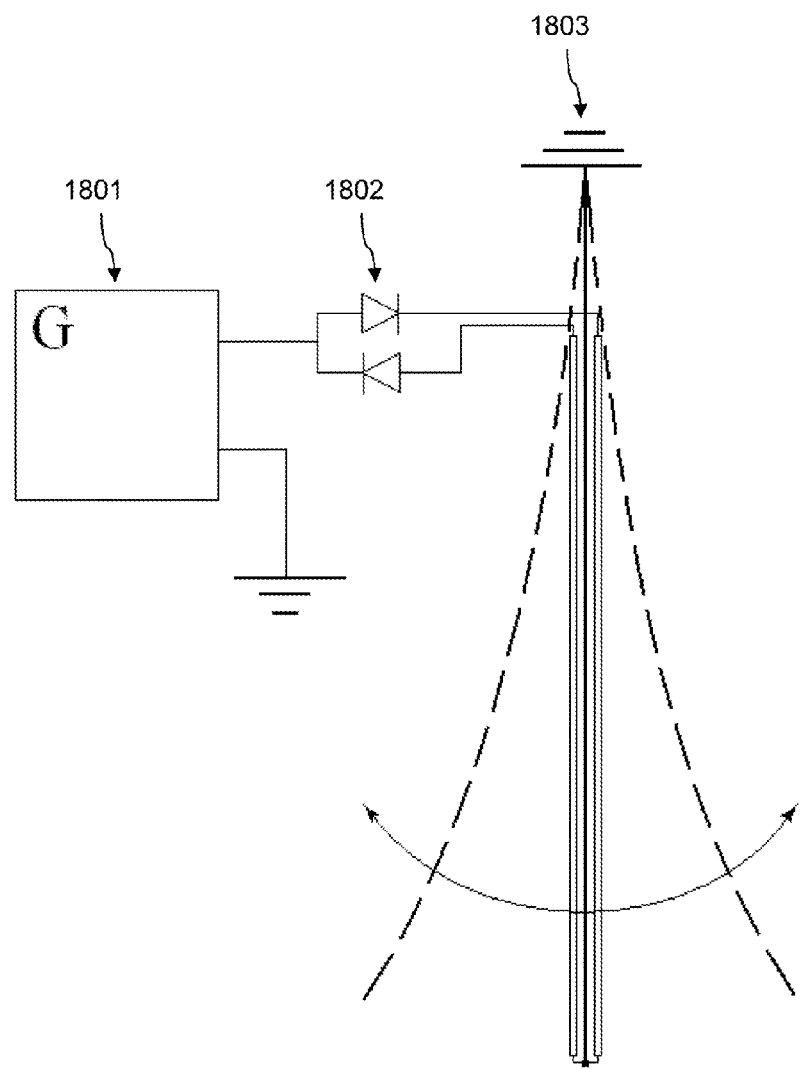
FIG. 18 is an illustration that shows large amplitude operation at 8 Hz resonant frequency for a cantilever-based, current-driven actuator that includes carbon nanotube aerogel sheet strips attached by direct overlay on opposite sides of a non-porous substrate strip.

Since acoustic wave propagation on the nanofiber sheet side of the bilayer assembly was not similarly impeded, actuation resulted from deflection of the sheet/substrate stack, as described in FIG. 18 and Example 17. This sheet/substrate stack can be conveniently anchored on one end to provide a cantilever that bends as a result of actuation.

Also, more complicated or less complicated geometries can be deployed that are well known in the art of actuating cantilevers. For example, the nanofiber sheet or sheet stack can be applied to only one side of the substrate, with the benefit that the diodes of FIG. 18 can be eliminated when resonant or non-resonant actuation is desired, for example, by applying periodically or non-periodically varying voltage pulses between 0 and V volts (thereby generating current pulses and resulting generated gas pressure pulses that are on only one side of the actuator). This operation contrasts with that for the diode-using device of FIG. 18, where resonant operation is typically obtained by providing square wave voltage that varies between −V and +V.

The substrate material is optionally selected to (a) provide sufficiently high flexibility to respond to the thermoacoustically generated pressure, (b) minimize thermal energy loss to the substrate, and (c) impede acoustic projection on the substrate side of the actuator. Sheet strips of ordinary plastic films can be used for this purpose. However, there is benefit of using a flexible substrate that reflects thermal radiation. For this purpose, and to minimize thermal and electrical contact with the substrate, a polymer coated metal foil substrate is usefully deployed.

E. Strain Amplification

It has now been discovered by Applicant that the forest-drawn carbon nanotube sheets have giant Poisson's ratios, and it has now been found by Applicant that these Poisson's ratios (a) have important consequences for actuation and (b) that they enable use of nanotube sheets and sheet strips as strain amplifiers. These Poisson ratios (the ratio of percent lateral contraction to the percent applied tensile elongation) were measured optically for stretch in the length direction to provide a width direction Poisson's ratio of 9.5±2.0 for sheet stacks with between 1 and 15 layers and strains up to 2%. The corresponding measured Poisson's ratio in the thickness direction was even larger (15 for a 30 layer sheet stack). A similarly giant Poisson's ratio (−12), but of opposite sign, has been observed for nanoporous polytetrafluoroethylene [K. E. Evans, A. Alderson, *Advanced Materials* 12, 617-628 (2000)]. These large Poisson's ratios indicate that the nanotube sheets can function as previously sought strain amplifiers [R. H. Baughman, *Nature* 425, 667 (2003)], which amplify strain over an order of magnitude without providing the added bulk and frequency limitations associated with conventional lever systems. Since both the width and thickness direction Poisson's ratios are so large, a percent extension in the nanotube sheet direction would produce ~23.5% decrease in sheet volume. This property of decreasing volume when stretched, called "stretch densification" is extremely rare [R. H. Baughman, S. Stafström, C. Cui, S. O. Dantas, *Science* 279, 1522-1524 (1998)] and implies that the aerogel has a negative linear compressibility in the length direction, meaning that it will expand in this direction when hydrostatically compressed without infiltration.

Because of the giant Poisson's ratios for length direction stretch, confinement of sheet length by rigid end supports substantially reduces actuation in width and thickness directions. The overall width (or thickness) change during actuation for a length confined nanotube sheet is approximately equal to the sum of those for a two step process: actuation in the absence of length constraint followed by applied stretch to return the length to its initial value. Correspondingly, for a 2% contraction in length for an unconfined sheet during actuation and the above Poisson's ratios, length confinement using rigid end supports decreases actuation strain in the width and thickness directions by about 19 and 30%, respectively.

F. Application of Actuation for Modifying the Structure and Properties of Nanofiber Arrays In addition to extending the capabilities of artificial muscles to giant strokes and strain rates at extreme temperatures, the present actuator mechanisms (of the present invention) enable applications that relate to the structural and properties changes of the nanotube sheets during large stroke actuation. These include, for example, the ability to dynamically modify the diffraction and polarization of light, and sheet transparency at over kilohertz frequencies for optical applications. Invention embodiments also include the ability to both vary the density of actuator sheets and to freeze this density for optimizing nanofiber electrodes for organic light-emitting displays, solar cells, charge stripping from ion beams, and cold or hot electrode electron field emission. This ability to increase sheet area using actuation and to freeze the actuated state is especially useful for applications where increased optical transparency is needed, like touch panel displays, solar cells, and light emitting devices.

Prototypical actuator materials are provided that enhance actuation using nanoscale amplification effects, due to the giant Poisson's ratios and even the resulting negative linear compressibilities and corresponding stretch densification. In embodiments of the invention, these giant Poisson's ratios can be used to amplify the strokes of other actuator materials and for amplifying the strains applied to sensors.

The nanotubes sheets act as a disordered grating to diffract light perpendicular to the alignment direction. Since actuation modifies grading spacings, the diffraction pattern changes as a function of the applied voltage (Example 16, below). Because of the ultrahigh response rate of width direction actuation and the kilohertz observed resonance frequencies, this diffraction can be dynamically modulated at over kHz frequencies for optical applications. This diffraction, as well as either actuation-produced changes in sheet transparency or light polarization or the combination of these effects, can also be used for precise control of actuation, by providing a feedback signal that can be used to control actuator voltage and thereby control actuator stroke.

Because of nanotube alignment in predominately one direction, they act as antennas to radiate polarized light from incandescently heated carbon nanotube sheets [M. Zhang et al., *Science* 309, 1215-1519 (2005)]. The existence of this polarization eliminates the energy waste and the optical component costs needed for obtaining polarized light output from the largely unpolarized light of ordinary incandescent light sources. Since these sheets can be switched from incandescent states in non-incandescent state in about 0.1 ms, they can eliminate the need for optical shutters for optical sensor systems. Carbon nanotube sheet actuation can be used to dynamically modulate the degree of polarization of this light at over kHz frequencies for these and other optical applications.

For maximizing actuation driven modulation of polarization, it is convenient to collect light from sheet regions where actuation is causing major changes in nanotube orientation as a result of the ballooning in width direction actuation described in Section B, above and pictured in FIGS. 3B-3C. Additionally, and equally noteworthy, the giant width-direction actuator strokes can be used to provide the equivalent of an ultra-fast optical shutter. In this embodiment of the invention, actuation displaces the incandescent light emitting source into and out-of the light collection region—thereby turning the collected light on and off.

The ability to use actuation to change nanofiber sheet dimensions can also be used to modulate the acoustic output of nanofiber sheet loud speakers, which have been described by L. Xiao et al. in *Nano Lett.* 82, 4539-4545 (2008). These loud speakers can be used either for ordinary sound projection or for cancellation of ambient noise. Sound directional projection depends upon sheet area and sound projection efficiency depends on sheet areal density. The presently described ability to change both sheet area and sheet areal density by over a factor of 3.2 (Examples 3 and 13 and FIGS. 3A, 3B, and 3D), using charge-injection-based actuation, is useful for this invention embodiment. Also, the described ability to permanently freeze this actuation can be used for the permanent optimization of loud speaker performance by permanently tuning nanofiber sheet density. For example, actuation providing optimized areal density can be permanently frozen by attachment of the actuator sheet to a textile, thereby providing an optimized clothing-supported loud speaker. Carbon nanotube sheets are especially useful as actuating materials for these thermoacoustic applications.

Since the actuating aerogel sheets can undergo large, reversible charges in dimension, they are suitable for use as actuators for electromagnetic antennas for the transmission and receipt of electromagnetic radiation at radio and microwave frequencies. More specifically, nanofiber sheet or sheet strip actuation can be used to change antenna frequency, antenna direction, or both, when the antenna comprises an actuating nanotube sheet or sheet strip.

Resistively heated carbon nanotube sheets are very efficient at transferring thermal energy to flowing gases, and the extend of this thermal energy transfer changes the temperature of the nanofiber sheet, which can be detected as a sensor response to gas flow rate by measuring sheet resistance (which correlates with sheet temperature). The ability to use actuation to modulate and optimize sheet thermal loss enables improvement in the sensitivity and reliability of nanotube-based gas flow sensors.

Carbon nanotube sheets provide attractive performance as cold field emission sources for such applications as x-ray tubes, lamps, and displays. The ability to use sheet actuation to rapidly and reversibly change the area over which electron emission is occurring can be used for these applications. Also, demonstration (Section B, FIG. 3C, and Example 4) that giant charge-injection-based actuation of carbon nanotube aerogel sheets occurred at incandescent temperatures (1900 K, and likely much higher) indicates that this actuation can be used for morphing of shape of a nanotube sheet incandescent source for light bulbs or a hot electrode electron emitter for x-ray sources, so that the appearance of the light source and the output of the x-ray source can be changed at will.

The ability to use actuation based on charge-injection to change the volumetric density of carbon nanotube sheets by a factor of 10 is useful for embodiments of the invention. The *Guinness World Record* for the lowest density solid (1.9 mg/cm$^3$)—an air-filled silica aerogel used as a thermal insulator and as a space-dust-collector for space missions—was recently superseded by a density of 1 mg/cm$^3$ for an air-free version of this silica nanofoam ["Lab's aerogel sets world record," Lawrence Livermore National Laboratory *Science & Technology Review* (October 2003)]. While this latter density is close to that observed for the nanotube component of the un-actuated carbon nanotube aerogel sheets (~1.5 mg/cm$^3$) of the present invention, demonstrated thickness and width direction strokes of above 3× shows that the density of a carbon nanotube aerogel sheet can be continuously and reversibly decreased about 10 fold by using charge-injection-based actuation. This density achieved by actuation for the gas free aerogel is about 10 times lower than for the above lowest density prior-art aerogel that is self-supporting and about ten times lower than that of air.

The demonstrated ability to use self-actuation to continuously and reversibly decrease sheet areal density by up to 220% (providing 3.3 times lower areal density), and then to optionally freeze this areal density (Examples 3 and 13 and FIGS. 3A, 3B, and 3D) is useful for applications as self-supported or deposited transparent electrodes. During continuous roll-to-roll manufacturing of transparent electrodes, electrically driven sheet expansion could be optionally accomplished between the steps of drawing an aerogel sheet from a forest and sheet lamination on a substrate film.

For organic solar cells and light emitting diodes, where interpenetration of a nanotube electrode by an organic hole injecting layer improves charge collection and injection efficiencies [R. Ulbricht et al., *Solar Energy Materials and Solar Cells*, 91, 416-419 (2007)], the benefits of decreasing areal density are in increasing sheet transparency and potentially increasing device lifetime and performance by decreasing surface non-uniformity that can result in nanoscale inter-electrode shorts.

Though carbon nanotube aerogel sheets provide attractive performance for charge stripping from ion beams [K. von Reden et al., *Nuclear Instruments and Methods in Physics Research* B 261, 44-48 (2007)], sheets having lower areal density are needed for increasing transparency to ion beams, which can be obtained by freezing the actuated state by contact with an annular support. Actuation of the nanotube sheets by charge injection enables a factor of 3.3 lower sheet areal density, which can be utilized in embodiments of the present invention.

Use of actuation, and most preferably charge-injection-based actuation, to effect sheet draw or nanotube yarn spinning from a nanotube forest provides important invention embodiments. For example, a voltage can be applied directly or indirectly to a nanotube forest and sheet (with respect to either a distant ground plane or a nearby counter electrode), so that actuation of the sheet (spinning wedge for the case of direct yarn spinning from a forest) effects the dimensions and properties of the final fabricated sheet or yarn. This applied voltage is preferably positive. This applied positive potential can affect both the draw process and change the dimensions of sheet regions that are either close to or far removed from the forest edge. The actuated sheet can be frozen (permanently stabilized) in the actuated state, for example, by contact with a substrate (and optional densification on the substrate, which can be a rotating mandrel that delivers the voltage to the sheet) or the actuated sheet state can be frozen by deposition of a coating on (or both on and within) a freestanding (potentially moving) nanotube sheet. For example, chemical vapor deposition (CVD), plasma enhanced CVD, or evaporation can be used to deposit such materials as metal oxides, metals and metal alloys, polymers, and forms of carbon on the sheet—thereby freezing or partially freezing actuation in the sheet plane or in the sheet plane and the sheet thickness directions.

Example 1

This Example 1 described the general methods used for forest-based fabrication and subsequent manipulation of individual carbon nanotube aerogel sheets and the fabrication of sheet stacks. The generally used method used for chemical vapor deposition (CVD) based MWNT forest synthesis and MWNT aerogel sheet fabrication has previously been described [M. Zhang et al., *Science* 309, 1215-1219 (2005)], though any method of forest synthesis that provides drawable nanotube forests can be deployed.

The synthesized nanotubes were typically ~12 nm diameter, approximately nine walls, MWNTs that provided ~25 nanotubes in an average bundle in the fabricated sheets. Sheet stacks were hand fabricated using a U-shaped metal frame to lift a sheet segment that was supported by a nanotube forest on one end and a wire support on the other end, during a process that both captured this sheet segment and reconnected the sheet to the original wire support (for repeat of this process during following layer depositions). The nanotube sheets strongly adhered to contacting substrates and end supports, which facilitated transfer to end supports for actuation and mechanical properties measurements. Sheets were optionally densified by imbibing and subsequent evaporation of ethanol while supported on a substrate, such as a glass microscope slide. When large numbers of sheets in a stack were required, a motor-powered rotating mandrel (like shown in FIG. 1) was used to assemble sheet stacks.

Example 2

Figure 19B:
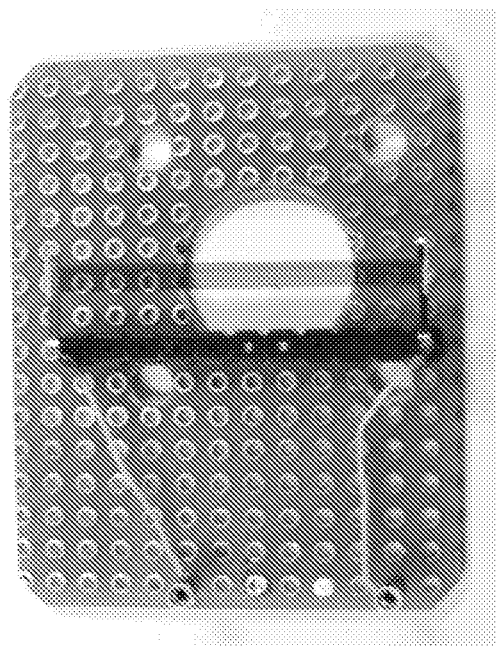
FIGS. 19A-19B are photographs showing two views of a measurement jig used for characterization of actuation in width and thickness directions at temperatures between 80 K and 1900 K. The pictured single MWNT sheet is supported by two rigid gold-coated copper electrode supports, which redundantly enable application of electrode voltage.
Figure 19A:
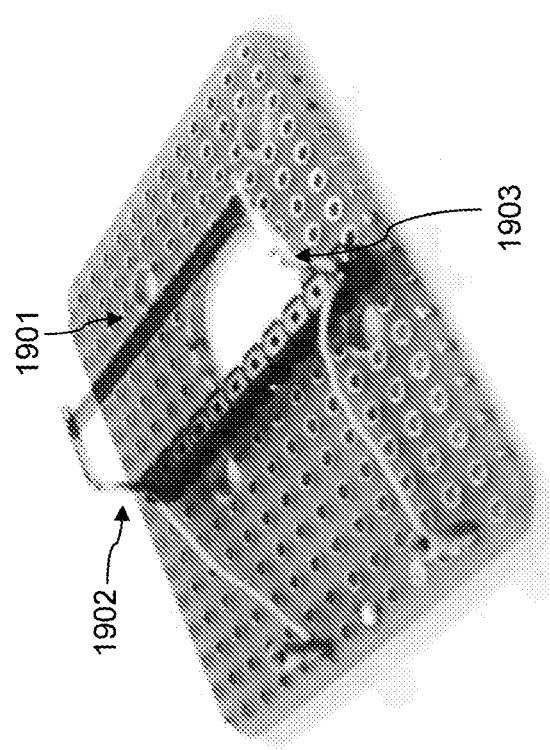

This Example 2 described some of the measurement methods used for characterizing width-direction and thickness-direction actuation for carbon aerogel artificial muscles. The measurement jig of FIGS. 19A-19B was used for measurement of actuation in width and thickness directions (FIGS. 5A-5B, 11, and 14) for actuator temperatures up to 1900 K for nanotube sheets and sheet stacks having fixed length. Since only the nanotube sheets were resistively heated to these temperatures, the jig temperature was much closer to ambient temperature. In a typical experiment (FIGS. 19A-19B), a nanotube sheet 1901 of described length and width was attached to the two rigid gold-coated copper electrodes 1902 and 1903 of the sample jig as shown in FIGS. 19A-19B.

Using 3 cm insulating pillars to reduce electric field distortions, this jig was attached to a stage that enabled the translational and rotational positioning needed for width and thickness measurements. Sheet width and thickness were optically determined by using the response of a photodetector to indicate the start and end of sheet intersection with a laser beam. To increase measurement accuracy for these measurements (and related measurements of actuation rate, FIG. 7, and electrically driven sheet oscillation, FIGS. 8A-8B and 9A-9B), the laser beam was focused (using a cylindrical lens) to a high-aspect-ratio ellipse (20 µm full width at half intensity) that was parallel to the sheet edge. These optical measurements used 633 nm light from a He—Ne laser, which was polarized parallel to the sheet length direction (the predominant nanotube alignment direction) in order to enhance sensitivity by maximizing sheet absorption.

Example 3

This Example 3 demonstrated that large stroke actuation (expansion of over 200%) can result in width and thickness directions from applying a voltage to a carbon nanotube aerogel sheet electrode with respect to a counter electrode that is a distant ground plane. Unless otherwise indicated here and elsewhere herein, this voltage was chosen to be positive in order to avoid electrical energy losses due to electron emission. FIGS. 3A-3B provide photographs of a rigidly end-supported 50 mm long by 2 mm wide nanotube sheet strip before actuation (FIG. 3A) and a photograph of the same sheet strip expanded in width by applying 5 kV with respect to ground (FIG. 3B). The corresponding width-direction actuator strain, measured at sample center is about 220%. FIG. 3C is a photograph of a 25 mm long nanotube sheet strip actuated at 1500 K by applying 3 kV, showing that giant stroke actuation can be obtained at this extreme temperature.

FIG. 5A shows measured width-direction actuation strain, $\Delta W/W_o$, versus applied voltage for N=1 to 8 stacks of single aerogel sheets and for a densified 8 sheet stack, labeled 1 to 8 and 8', respectively, having $L_o$=25 mm and $W_o$=2 mm. These results showed that width-direction actuator strain obtained for a given applied voltage decreased with increasing number of sheets in a sheet stack.

FIG. 5B provides a universal curve that describes all of the results of FIG. 5A for undensified nanotube sheet stacks by using the normalization factor $S_N=(N^{-1}-R)/(1-R)$, and a single fit parameter R.

FIG. 11 shows actuation generated thickness-direction strain versus applied voltage for an eight-layer sheet strip with $L_o=25$ mm and $W_o=2$ mm and $H_o=0.3$ mm. FIGS. 12A-12B are edge-view photographs of the sheet strip in the sample jig of FIGS. 19A-19B before (FIG. 12A) and after (FIG. 12B) actuation, showing at midpoint the laser beam used for thickness measurement.

All of the above results were for length-end supported nanotube sheets, measurements of $\Delta W/W_o$ and $\Delta H/H_o$ were made midway between these supports, and the provided lines are guides for the eye.

Example 4

This Example 4 showed that charge-injection-driven actuation for carbon nanotube aerogel sheets only weakly depends upon temperature, which has enabled the experimental demonstration of giant actuation from 80 K to 1900 K. FIG. 14 shows measured width-direction actuator strain for a single nanotube sheet strip (25 mm long by 1 mm wide) on switching between 0 and 3 kV at the indicated temperatures. The FIGS. 15A-15C picture the actuated sheet of FIG. 14 at incandescent temperatures. These results were for length-end-supported nanotube sheets, measurements of $\Delta W/W_o$ were made midway between these supports (as for other results on width and thickness actuation reported herein), and the provided line is a guide for the eye.

Example 5

This Example 5 showed that width-direction strain increases with increasing $L_o/W_o$ ratio for carbon nanotube aerogel sheets. FIG. 4 provides width-direction actuation strain ($\Delta W/W_o$) as a function of applied voltage for single MWNT aerogel sheets having different $L_o/W_o$ ratios (46, 41, and 17, as shown in curves 401-403, respectively). The sheets were held by rigid length direction supports, which maintain constant sheet length and constant sheet width and thickness at the supports. Actuation strain for a specified voltage increases with increasing $L_o/W_o$, as does the voltage range where transition occurs between $\sim V^2$ and $\sim V^{2/3}$ dependencies for $\Delta W/W_o$.

Example 6

This Example 6 demonstrated voltage-driven actuation of carbon MWNT aerogel sheet strips in the sheet length direction, and showed that (a) actuator strain was reduced to a few percent in this high gravimetric modulus direction, (b) the direction of electrostatically driven stroke was opposite to that for width and thickness directions, and (c) the actuator generated isometric gravimetric stress in the sheet-length direction was about 30 times higher than for natural muscle.

Figure 13A:
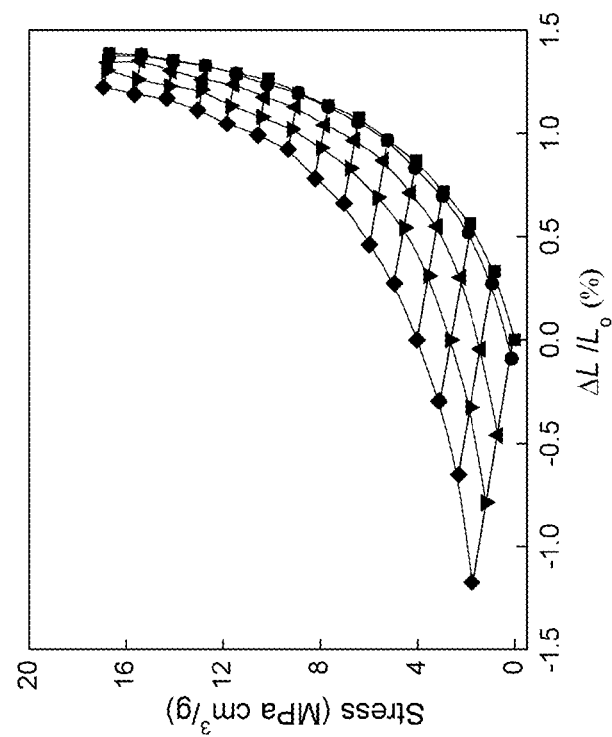
FIG. 13A is a graph that shows measured gravimetric stress versus length-direction strain at constant applied voltage (curves rising to the right) and for increasing voltage for a given tensile stress applied before actuation (lines rising to left), where the squares, circles, up triangles, down triangles, and diamonds correspond to applied voltages of 0, 0.4, 0.8, 1.2, and 1.6 kV, respectively. The investigated single sheet was 14.3 mm long by 0.55 mm wide.
Figure 20:
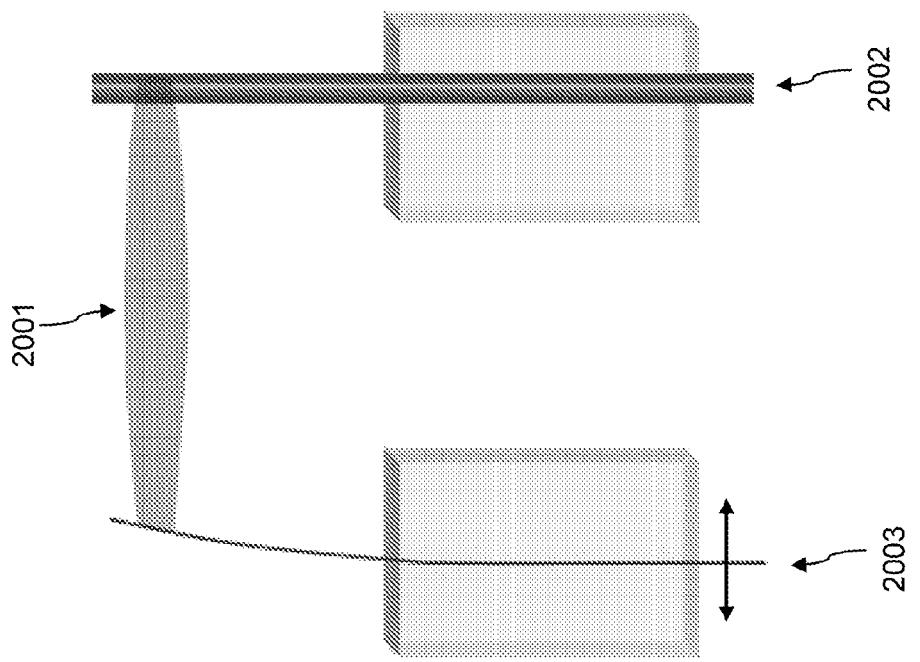
FIG. 20 is an illustration that shows the measurement jig used to determine specific stress generation and work capacity of carbon nanotube sheets for length-direction actuation at room temperature.

Actuation in the sheet length direction (including load-dependent actuation strain, specific stress generation, and work capacity) was characterized using the jig in FIG. 20, providing the results of FIG. 13A. FIG. 13A provides specific stress (i.e., density normalized stress) versus length-direction strain at constant applied voltage (curves rising to the right) and for increasing voltage for a given specific tensile stress applied before actuation (lines rising to left), where the squares, circles, up triangles, down triangles, and diamonds correspond to applied voltages of 0, 0.4, 0.8, 1.2, and 1.6 kV, respectively. The investigated single sheet was 14.3 mm long and 0.55 mm wide. The FIG. 13B provides corresponding specific work capacity as a function of initially applied specific stress for different applied voltages.

The used jig of FIG. 20 supported a nanotube sheet strip 2001 between a rigid post 2002 and a cantilever 2003 that acted as a spring, whose effective force constant was independently measured. Using this cantilever force constant, specific stress versus length-direction strain at constant applied voltage and for increasing voltage for a given specific tensile stress applied before actuation were obtained.

This experimental data provided the following results: Length-direction actuation generated an isometric specific stress of up to 4.0 MPa cm$^3$/g (corresponding to the data point for $\Delta L/L_o=0$ and 1.6 kV in FIG. 13A). Since electrostatically generated stress is proportional to 1/H, densification of the sheet by decrease in sheet thickness H left the isometric specific stress unchanged. Hence, a densified sheet strip with a density of 0.8 g/cm$^3$ had an isometric stress generation capability of 3.2 MPa, which is about 32-fold higher than the maximum sustainable stress generation capability of natural skeletal muscle.

The actuator stroke for a specified change in applied potential decreases with increasing initially applied stress, since the Young's modulus increases with strain, so the specific work per cycle reached a plateau, where there is little sensitivity to the initially applied stress. The maximum achieved work per cycle (show in FIG. 13B) is ~30 J/kg, compared with the maximum capability of ~40 J/kg [J. D. W. Madden et al., *IEEE J. of Oceanic Eng.* 29, 706-728 (2004)] for natural muscle.

Example 7

This Example 7 showed that large relatively large width-direction actuation (14%) of carbon nanotube aerogel sheets can be obtained non-resonantly at a relatively low applied voltage (260 V dc). Adding an ac voltage (16 volts peak-peak at the resonant frequency) on the static dc bias potential (both with respect to a distant ground electrode) generated oscillations of the sheet edge that increased the accuracy of optical measurement of width-direction actuation for low applied dc bias potentials (using a photodiode that detected laser beam radiation transmitted close to sheet edge).

The results of these measurements (FIG. 6 for $L_o/W_o=14.1$) indicated that width-direction actuation for a low applied dc voltage deviated noticeably from proportionality with V$^2$ and that $\Delta W/W_o$ was about 14% at 260 V dc. This deviation might be a result of increasing modulus for width-direction elongation with increasing width-direction strain.

Example 8

This Example 8 experimentally demonstrated that the carbon nanotube aerogel sheets provide giant actuation at extreme temperatures where no other artificial muscle can function (from about 80 K to about 1900 K). The measurements were made in vacuum (10$^{-6}$ Torr) in a grounded 10 cm diameter cryostat in which the sample was centrally located using the jig shown in FIGS. 19A-19B. High temperatures were achieved by passing current through the sample, and measured optically (Photo Research PR-650 Spectracolorimeter) using emitted radiation.

The data in FIG. 14 showed that width-direction actuator stroke does not significantly change upon increasing temperature from 300 K to 1365 K. The nanotube sheets can be repeatedly cycled between 300 K and at least 1500 K without causing significant change in actuation at either temperature. Also, no change in actuator stroke was observed in going from 300 K to the lowest observation temperature (80 K). Since it has been found, surprisingly, that these artificial muscles are enthalpic rubbers that have largely temperature independent elastic constants, and the electrostatic driving force for actuation has not significant temperature dependence, giant stroke actuation is realizable to arbitrarily close to 0 K.

Example 9

This Example 9 experimentally demonstrated that the average stroke rate for width-direction actuation of a carbon nanotube aerogel sheets can reach at least $3.66 \times 10^4$%/s, which is higher than for any prior-art artificial muscle, and dramatically higher than for any prior art muscles that is non-resonantly driven. As illustrated in FIG. 7, the stroke rate was determined by measuring (with a two channel oscilloscope 708) the time delay between an antennae-detected trigger pulse from 707 (generated by closing the switch 705 that applied a voltage from power supply 703 to the nanotube sheet 704) and subsequent movement of the sheet edge to intersect a laser beam from laser source 701.

Intersection of the laser beam and the sheet edge, as a result of completion of width-direction stroke, provided light scattering that was detected by a silicon photodiode 706. The laser beam, elliptically shaped with lens 702 and polarized along the sheet draw direction, is the same as described above for other experiments. The nanotube sheet length was kept constant during actuation by using rigid end supports and the sheet length and width were 71.4 mm and 2 mm, respectively. Complete width direction actuation ($\Delta W/W_o$=183%) occurred in 5 ms for actuation at ambient, providing an average width-direction action stroke rate of $3.66 \times 10^4$%/s for switching between 0 and 5 kV.

Example 10

This Example 10 demonstrated low-loss width-direction resonant actuation of a carbon nanotube aerogel sheet at kilohertz frequency using a 1 $V_{RMS}$ (Root Mean Square) drive voltage. Resonant vibration in the sheet width direction was obtained by applying this ac voltage to the sheet, with respect to either (a) symmetric counter-electrodes 802 orthogonal to the width direction of the sheet 801 (FIG. 8B) or (b) a distant ground (the walls of a 10 cm diameter cryostat in which the sheet was centrally located).

Figure 8B:
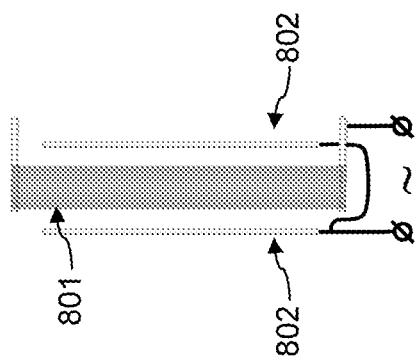
FIG. 8B is an illustration of the apparatus from which the measured results of FIG. 8A were obtained. Actuation resulted from the application of an alternating voltage (1 $V_{RMS}$) to the nanotube sheet (801) with respect to two symmetrically placed orthogonal counter electrode plates (802), 3 mm from sheet edges (viewed orthogonal to the sheet plane and parallel to the plate planes in FIG. 8B). The resonant frequency was $f_R$=1089 Hz. A Q factor of 455 results from dividing $f_R$ by the width of the resonance peak at $\sqrt{2}/2$ of maximum amplitude, which is indicated in FIG. 8A.

FIG. 8A shows the measured results obtained. Relative oscillation amplitude as a function of driving frequency was optically measured using a photodiode to detect oscillation in the intensity of light (633 nm wavelength, polarized parallel to the sheet length direction). Essentially identical resonant frequencies ($f_R$) and quality factors (Q) for width-direction oscillation ($f_R$=1089 Hz and Q=455 for a 25.0 mm long by 1.8 mm wide single MWNT sheet) were obtained for ac voltages applied to the sheet with respect to symmetric counter electrodes 802 (as shown in FIG. 8B) or with respect to a distant ground. These measurements were made in vacuum.

Example 11

Figure 9B:
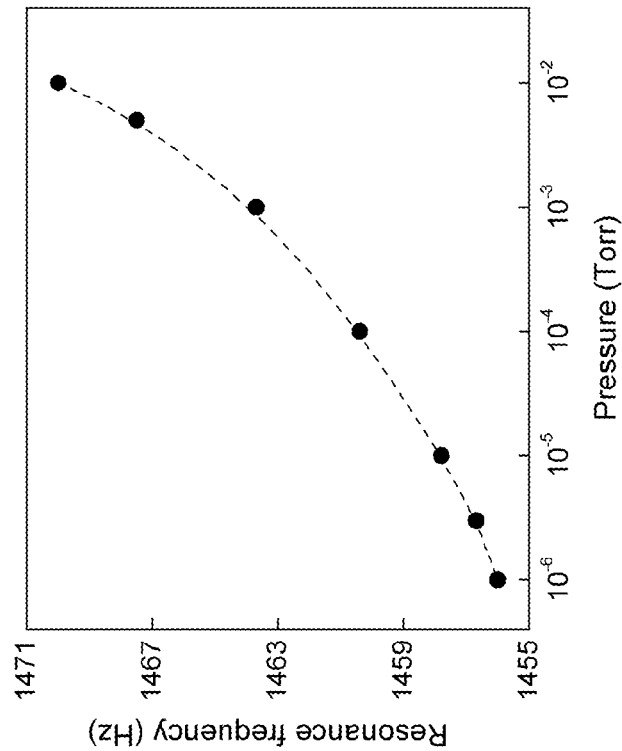
FIG. 9B is a graph that shows the measured dependence of width-direction resonant frequency on air pressure for the experiment of FIG. 9A.
Figure 9A:
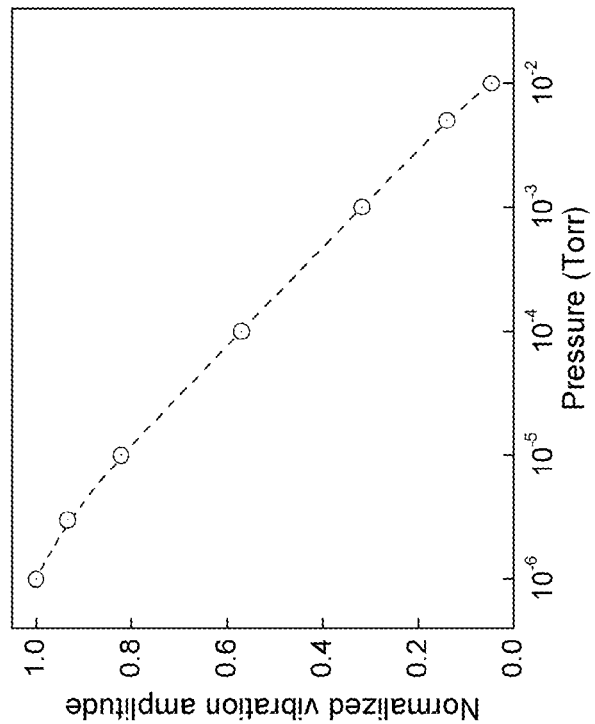
FIG. 9A is a graph that shows the measured dependence of width-direction normalized resonant vibration amplitude on air pressure for a 22.7 mm long by 1.3 mm wide single undensified MWNT aerogel sheet nanotube sheet that was characterized as described in FIG. 8B.

This Example 12 experimentally demonstrated the dramatic effect of introduction of air on the electrically driven resonant vibration of a carbon nanotube aerogel sheet. The size of this dependence on gas pressure demonstrates that resonantly driven carbon aerogel sheet actuators can be used as gas pressure sensors. The measurement method and sample was the same as for Example 10. The obtained experimental results (FIG. 9A-9B) showed that the introduction of even low air pressures dramatically decreased resonant vibration amplitude (FIG. 9A), and increased resonant frequency (FIG. 9B). Both of these effects can be deployed for using a resonantly driven aerogel sheet as a gas sensor.

Example 12

This Example 12 for a carbon nanotube aerogel sheet demonstrated that high-stroke resonant actuation (±30% width-direction strain) can be driven at kilohertz frequency using a 10 $V_{RMS}$ applied voltage. This dramatic reduction in the ac voltage needed for high stroke actuation was obtained by using a combination of electronic and mechanical resonances.

Since the nanotube sheet 1003 in FIG. 10C was largely a capacitive load, resonant electronic actuation could be achieved by placing a small inductor 1002 in series between the ac power supply 1001 and the nanotube sheet. The capacitance (C) of this sheet was with respect to a distant ground 1004. This inductance was chosen so that the resonant electronic frequency nearly equaled the mechanical resonant frequency. At electronic resonance, the voltage from the power supply ($V_{RMS}$) was increased to $QV_{RMS}$, where Q is the quality factor for electronic resonance. For such double resonant actuation in vacuum at about 1100 Hz, shown in FIG. 10C, an applied voltage of 10 $V_{RMS}$ from a power supply was increased to a measured 150 $V_{RMS}$ sheet voltage by introducing this small 2.4 H inductor.

The actuation achieved using the 10 $V_{RMS}$ power source and this simple circuit was ±30% strain, where the sign ± indicates approximately symmetrical expansion and contraction of sheet in opposite extremes of the cycle. The photographs in FIGS. 10A-10B were for the unactuated (FIG. 10A) and resonantly actuated (FIG. 10B) sheets, where intentional folding at sheet edges (evident by the dark lines in FIG. 10A) helps mark the location of sheet edges at the extremes of oscillation.

Example 13

This Example 13 showed that giant actuation (3×) of carbon nanotube aerogel sheets can be permanently frozen, thereby enabling the tuning of sheet areal density for device electrode applications. FIG. 3D provides pictures of identical dimension nanotube sheet strips 301 and 302 that were contacted with an Au-coated Si substrate while in un-actuated and actuated states, respectively, and subsequently densified on the substrate by absorption and evaporation of ethanol.

Example 14

This Example 14 demonstrated a second type of electrostatic actuation for carbon nanotube sheets. FIG. 16 pictures actuation due to repulsion between two delaminated MWNT aerogel sheets that were initially in a two sheet stack. The clam shell type of structure (corresponding to delaminated sheets 1601 and 1602) pictured here for the actuated state (1.6 kV applied voltage in air) reverted to a stacked sheet structure (corresponding to the laminated structure) when voltage-induced charging was removed during the reverse part of the actuator cycle. This particular type of actuation appeared because only one of the wire-based length direct supports 1603 was rigid. The other length direction support 1604 was flexible and the displacement of this flexible support enabled the delamination-lamination process that provided the actuation.

The separation of sheets was accompanied by contraction the separation between the rigid support and the flexible wire support, which acted as a cantilever spring. The contraction was 2.5% for an applied 1.6 kV. The maximum achieved work-per-cycle for the reversibly delaminated double sheet was ~45 J/kg, i.e., about 50% larger than that for single MWNT sheet of Example 6. This value also exceeded the maximum capability of ~40 J/kg [J. D. W. Madden et al., *IEEE J. of Oceanic Eng.* 29, 706-728 (2004)] for natural muscle.

Example 15

This Example 15 demonstrated width-direction actuation of a carbon nanotube aerogel sheet that resulted from passing a current in the sheet length direction (the nanotube orientation direction). FIG. 17 schematically illustrates current-driven actuation of a carbon nanotube aerogel sheet by using magnetic forces between nanofibers. Application of a potential difference 2 V between two rigid wires 1702 and 1703 that supported an aerogel sheet 1701 resulted in current flow in the nanofiber alignment direction (the sheet length) and resulting contraction in sheet width and thickness as a consequence of Ampère magnetic forces.

This magnetic actuation was characterized experimentally in the width direction by using a high resolution digital camera to record dimensional changes and a pulsed current source (Keithley 2345A power supply). In a typical experiment, a 4 mm long and 10 μm wide carbon nanotube sheet strip was directly drawn from a MWNT forest and then attached to two rigid gold-coated copper electrodes, which provided both end supports and voltage leads. A width-direction actuation stroke (a contraction) of 30% was observed in air for a dc current of 10 mA.

Example 16

This Example 16 demonstrated that width-direction charge-injection-based actuation of carbon nanotube sheets produced rapidly reversible changes in optical diffraction pattern for these sheets, which can be used for optical applications. For example, actuation produced changes in diffraction pattern can provide a feedback signal for precisely adjusting applied actuator voltage so as to precisely control actuator stroke. This diffraction pattern, which resulted from slit-shaped void spaces in single nanotube sheets, was characterized as a function of applied voltage using a carbon nanotube sheet strip held by rigid end supports.

Measurements were for 532 nm wavelength light from a laser pointer, which was directed orthogonal to the sheet direction and polarized parallel to the nanotube orientation direction. This polarization provided the highest diffraction intensity for the observed irregular array of diffuse diffraction spots. Using this method, movies were recorded showing width-direction actuation of a single nanotube sheet (by 125%) on going from 0 to 5 kV (and the reverse) and corresponding changes in diffraction pattern. Over the recorded 9 cycles, the sheet was charged and later discharged to ground by manually turning a high voltage switch. Changes in diffraction pattern were observed to occur reversibly and very rapidly (at the same rate as width-direction actuation), and to correlate with actuator stroke. Due to decease in sheet areal density in going to the actuated state, the intensity of diffracted pattern generally decreases with increasing actuation in the sheet width direction.

Example 17

This Example 17 demonstrated large amplitude operation at 8 Hz resonant frequency for a cantilever-based, current-driven electromechanical actuator that comprised carbon nanotube aerogel sheet strips attached by direct overlay on opposite sides of a non-porous substrate strip. The substrate strip was heat reflecting (a 8 cm long and 2 cm wide aluminum foil that was coated on both sides with a thin, electronically insulating layer of polyvinyl alcohol, PVA). As illustrated in FIG. 18, at the base of cantilever 1803 (comprising the aluminum foil center, insulating coatings, and the two outer nanotube sheet strips) the aluminum foil was attached to the ground of the square-wave output of power supply 1801. The nanotube sheet strips were separately attached at the base of the cantilever 1803, via diodes 1802 (operating in opposite directions for the two nanotube sheet strips), to the above-ground power supply electrode, and then (at cantilever tip) to the grounded output lead of the power supply (via mutual connection to the grounded aluminum foil).

As the sign of the above-ground lead of the power supply switched from positive to negative, resistive heating switched from one nanotube sheet to the other. In both parts of this cycle, the pressure pulse due to heated air pushed the cantilever beam in the opposite direction from the heated nanotube sheet. This oscillation in the direction of gas pressure pulse caused the cantilever beam position to oscillate. This described width and length cantilever oscillated in air at a resonant frequency of 8 Hz, providing a 2 cm amplitude oscillation for the cantilever tip for a drive current of 50 mA.

VARIOUS FEATURES OF THE INVENTION

The present invention includes nanofiber-based actuators (such as artificial muscles) and strain amplifiers.

In general, in one aspect, the invention features an electrically powered actuator that includes a counter electrode and an actuating electrode electrically coupled to the counter electrode. The actuating electrode includes a network of electrically interconnected nanofibers. The actuator is configured to change dimension, generate stress, or a combination thereof during actuation of the actuating electrode in the absence of liquid or solid electrolyte. The actuation includes direct or indirect application of voltage to the actuating electrode with respect to the counter electrode.

Implementations of the invention can include one or more of the following features:

The nanofibers can predominately have a smallest lateral diameter that is at most about 100 nm. The nanofibers can predominately have a smallest lateral diameter that is at most about 10 nm.

The nanofibers can be graphene ribbons, carbon nanotubes, superconducting nanofibers, non-elastomeric conducting polymer nanofibers, elastomeric conducting polymer nanofibers, electrically conducting oxide nanofibers, conductor coated nanofibers, or combinations thereof.

The counter electrode can be a ground plane at an arbitrarily large distance from the actuating electrode. An "an arbitrarily large distance" means a distance from the ground plane to the actuating electrode that is sufficiently large that further increase of this distance does not substantially effect actuation of the actuating electrode.

The actuating electrode and the counter-electrode can be proximate.

The counter electrode can be an actuating counter-electrode.

The actuator can include at least three electrodes, wherein at least one of the electrodes is an actuating electrode and all three electrodes do not have the same applied voltage at all times during actuation. The relative locations of the actuating electrode with respect to counter electrodes can be selected to minimize translational displacement of the actuating electrode as a result of interelectrode electrostatic interactions.

The actuating electrode can include an aerogel or a densified aerogel. The aerogel can have a density of at most about 10 mg/cm$^3$ before actuation. The actuation of the actuator can decrease aerogel volumetric density by a factor of at least about 2.

The network of electrically interconnected nanofibers can include electrostatically spun nanofibers.

The network of electrically interconnected nanofibers can include carbon nanotubes.

The network can include an aerogel.

The aerogel can include carbon nanotubes synthesized in the gas phase.

The network can include an aerogel formed at least in part by draw from an array of approximately parallel carbon nanotubes in the form of a forest.

The network can include a densified aerogel formed by densification of an aerogel. The densification can include exposure of the aerogel to a liquid.

The carbon nanotubes can include at least approximately 50 wt. % multiwalled carbon nanotubes.

The carbon nanotubes can include at least approximately 50 wt. % few walled nanotubes, 50 wt. % single walled nanotubes, or 50 wt. % of a mixture of few walled and single walled nanotubes.

The network can include a yarn. The yarn can be configured to provide actuation in the yarn length direction.

The network can include a sheet or sheet strip. A length, width, or thickness of the sheet or sheet strip, or any combination thereof, can be configured to change during the actuation. The actuator can be held by two supports that are proximate to the sheet or the sheet strip ends. Both of the supports can be rigid. The actuation can result from dimensional changes in width or thickness directions or a combination of width and thickness directions. At least one of the supports can be flexible. One end of the sheet or sheet strip can be attached to a forest of electrically conducting nanofibers from which the sheet or sheet strip is being drawn. The forest of electrically conducting nanofibers can include a forest of carbon nanotubes. The actuation of the sheet or sheet strip can alter the structure of the sheet or sheet strip. The actuation of the sheet strip can affect conversion of the sheet strip into nanotube yarn.

The actuating electrode can include at least two weakly laminated nanofiber sheets or sheet strips that are effectively end supported in the length direction using at least one flexible end support. The actuation can occur at least in part because of substantially reversible delamination and lamination of these weakly laminated sheets or sheet strips. The nanofibers can include carbon nanotubes.

The network of electrically interconnected nanofibers can include nanofibers that are predominately oriented in one direction.

The network of electrically interconnected nanofibers can be predominately an enthalpic rubber. The nanofibers can include carbon nanotubes.

The sheet or sheet strip can be an aerogel having a thickness of at most about 200 microns.

The sheet or sheet strip can include a densified aerogel having a thickness of at most about 500 nm.

The thickness of the densified aerogel can at most about 100 nm.

The areal density of the sheet or sheet strip in the sheet or sheet strip plane can be at most about 100 μg/cm$^2$.

The ratio of length to width of the sheet or sheet strip before actuation is at least about 10.

The actuation can include charge injection. The charge injection can cause percent actuation having differing sign in different directions. At least one counter electrode can be proximate at least one actuating electrode. The counter electrode and the actuating electrode can be effectively separated by an arbitrarily large distance.

The actuator can be operable through actuator produced change in nanofiber network structure or properties to modify the polarization of light, modify sheet transparency, switch the diffraction of light, modify the cold or hot emission of electrons, influence the effectiveness of an electrode for charge stripping from an ion beam, modify nanofiber sheet transparency, modify the appearance of an underlying surface, modify thermoacoustic emission, or any combination thereof. The actuator can be operable at a frequency of at least about 100 Hz. The actuator can be operable at a frequency of at least about 1000 Hz. The actuator can be operable at a resonant frequency without substantial mechanical loss. The actuator can be operable to provide a Q factor for mechanical loss of at least about 100.

The actuator can be operable to provide at least about 5% strain of actuation between about 0 K and about 1900 K.

The actuator can be operable to apply a positive potential to the nanofiber network.

The actuator can be operable to achieve about 100% actuation in at least one dimension.

The actuator can be operable to achieve at least about 1% actuation in a direction along which the network nanofibers are predominately oriented.

The actuation can modify thermal conductance or thermal emission for the network of electrically interconnected nanofibers.

The actuator can be operable to convert mechanical energy to electrical energy.

The actuator can be operable for a mechanically operated display.

The actuator can be operable for an incandescent lamp. The incandescent element in the lamp can include the network of electrically interconnected nanofibers. The actuation of the network of electrically interconnected nanofibers can modify the operation of the lamp.

The actuator can be operable for a fluorescent lamp. The cold electrode electron field emission source of the lamp can include the network of electrically interconnected nanofibers. The actuation of the network of electrically interconnected nanofibers can modify the operation of the lamp by modifying electron emission.

The actuator can be operable for an x-ray source. The electron emission source of the x-ray source can include the network of electrically interconnected nanofibers. The actuation of the network of electrically interconnected nanofibers can modify the operation of the x-ray source by modifying electron emission.

The actuator can be operable for an antenna. The antenna can include the network of electrically interconnected nanofibers. The actuation of the network of electrically interconnected nanofibers can modify the characteristics of the antenna.

The actuator can be operable for a thermoacoustic loud speaker or a thermoacoustic sound cancellation device. The thermoacoustic source can include a nanofiber sheet or sheet strip. The actuation of the nanofiber sheet or sheet strip can modify thermoacoustic emission. The nanofiber sheet or sheet strip can include carbon nanotubes.

The actuator can be operable for a gas-flow detector. The actuating nanofiber network can be substantially in sheet or sheet strip form. The actuation of the nanofiber network can modify the characteristics of the gas-flow detector.

The actuating electrode is comprised in a tunable diffraction grating.

The actuating electrode is comprised in a tunable light polarizer.

In general, in another aspect, the invention features a process that includes electrically actuating a conducting material with initial dimensions. The process further includes substantially changing a dimension of the conducting material. The process further includes contacting the actuated material with a substrate or coating or infiltrating the material in the actuated state to permanently stabilize the conducting material in a state between the initial dimensions and the changed dimensions.

Implementations of the invention can include one or more of the features listed above, as well as the following features:

The conducting material can include a network of electrically interconnected nanofibers. The conducting nanofibers can include carbon nanotubes that are configured as a sheet or sheet strip.

The coating or infiltration can be by chemical vapor deposition, plasma enhanced chemical vapor deposition, evaporation, or combinations thereof. The coating of infiltration can be by a metal oxide, a metal, a metal alloy, a polymer, a form of carbon, or a mixture thereof.

The areal density of the initial materials in the unactuated state can be decreased by a factor of at least about 2 in the stabilized actuated state.

A permanently stabilized actuated state can be obtained by contacting an electrically actuated nanofiber sheet with a substrate, and subsequent densification of the sheet on the substrate.

In general, in another aspect, the invention features an electrode made by a process that includes electrically actuating a conducting material with initial dimensions. The process further includes substantially changing a dimension of the conducting material. The process further includes contacting the actuated material with a substrate or coating or infiltrating the material in the actuated state to permanently stabilize the conducting material in a state between the initial dimensions and the changed dimensions.

Implementations of the invention can include one or more of the features listed above.

In general, in another aspect, the invention features a solar cell that includes the electrode made by the above process.

In general, in another aspect, the invention features a light emitting diode or diode display that includes the electrode made by the above process.

In general, in another aspect, the invention features a touch screen display that includes the electrode made by the above process.

In general, in another aspect, the invention features an ion transport electrode that includes the electrode made by the above process.

In general, in another aspect, the invention features an electrochemical device that includes the electrode made by the above process.

Implementations of the invention can include one or more of the features listed above.

In general, in another aspect, the invention features an electrically powered actuator that includes an actuator material (including a network of oriented electrically interconnected nanofibers) and electrical interconnections to an actuating electrode that enable passage of current through the network. The actuator is configured to change dimension, generate stress, or a combination thereof during actuation of the actuating electrode. The actuation is predominately caused by magnetic interactions between nanofibers or nanofiber bundles.

Implementations of the invention can include one or more of the features listed above, as well as the following features:

The nanofibers can be graphene ribbons, carbon nanotubes, superconducting nanofibers, conducting polymer nanofibers, electrically conducting oxide nanofibers, conductor coated nanofibers, or combinations thereof.

The nanofibers in said network can be at least partially oriented in one direction. The electrical connections can enable current to flow in predominately the nanofiber orientation direction. The contribution from current flow can result in a lateral contraction orthogonal to the direction of current flow.

The network of oriented nanofibers can include carbon nanotubes. The network of oriented nanofibers can be a sheet or sheet strip drawn from a carbon nanotube forest. The nanotubes can be oriented within the sheet plane.

The charge injection actuation of the nanofiber network in a first part of the actuation cycle and current-driven actuation of the nanofiber network in a second part of the actuation cycle can operate to provide actuation in substantially opposite directions. The network of electrically interconnected nanofibers can include carbon nanotubes. The nanofiber network can be in the form of a sheet having an in-plane alignment direction. The current-driven actuation in the second part of the actuation cycle can be by passing a current along the alignment direction.

In general, in another aspect, the invention features an electrically powered actuator that includes an actuator material (that includes a network of electrically interconnected nanofibers) and electrical interconnections that enable passage of current through the network. The actuator is configured to change shape, generate stress, or a combination thereof during actuation. The actuation is predominately caused by pressure waves in a surrounding gas generated by resistive heating of the network of electrically interconnected nanofibers.

Implementations of the invention can include one or more of the features listed above, as well as the following features:

The flexible sheet or sheet strip can include a heat reflective material. The heat reflective material can be a metal or metal alloy that is overcoated with a thermally and electrically insulating layer that is positioned between the metal or metal alloy. The network can include electrically interconnected nanofibers.

The electrically power actuator can further include networks of electrically interconnected nanofibers on opposite sides of said flexible sheet or sheet strip that have electrical connections enabling substantially independent resistive heating of said networks. The flexible sheet or sheet strip can include a metal or metal alloy that is coated on opposite sheet sides by an electrically and thermally insulating polymer. The metal or metal alloy can include aluminum.

In general, in another aspect, the invention features a strain amplifier made by a process that includes providing a forest of carbon nanotubes and drawing a nanotube sheet or sheet strip from the forest of carbon nanotubes. The strain amplifier has an amplification factor of at least about 2. The Poisson's ratio for a tensile strain applied in the sheet or strip draw direction is at least about 2.

Implementations of the invention can include one or more of the features listed above, as well as the following features:

The strain amplifier can be operable to convert an applied strain in the length direction of the sheet or sheet strip, corresponding to the nanofiber alignment direction, to at least about 5 times higher strain in the width or thickness direction of the nanotube sheet or sheet strip. The strain amplifier can be operable for amplifying the stroke of an actuator or the strain applied to a sensor.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. An electrically powered actuator, comprising:
   (i) a counter electrode; and
   (ii) an actuating electrode electrically coupled to the counter electrode, wherein
      (a) the actuating electrode comprises a network of electrically interconnected nanofibers, and
      (b) the actuating electrode is capable to cause electrostatic actuation of the actuator in the absence of an electrolyte, wherein (I) said actuator is capable to change dimension, generate stress, or a combination thereof during said actuation, and (II) said actuation comprises direct or indirect application of voltage to the actuating electrode with respect to the counter electrode.

2. The electrically powered actuator of claim 1, wherein the nanofibers predominately have a smallest lateral diameter that is at most about 100 nm.

3. The electrically powered actuator of claim 1, wherein the nanofibers are selected from the group consisting of graphene ribbons, carbon nanotubes, superconducting nanofibers, non-elastomeric conducting polymer nanofibers, elastomeric conducting polymer nanofibers, electrically conducting oxide nanofibers, conductor coated nanofibers, and combinations thereof.

4. The actuator of claim 1 wherein said counter electrode is a ground plane at an arbitrarily large distance from the actuating electrode.

5. The actuator of claim 1, wherein the actuating electrode and the counter electrode are proximate.

6. The actuator of claim 1, wherein the counter electrode comprises an actuating counter electrode.

7. The actuator of claim 1, wherein the actuating electrode comprises an aerogel or a densified aerogel.

8. The actuator of claim 1, wherein the network of electrically interconnected nano fibers comprises electrostatically spun nano fibers.

9. The actuator of claim 1, wherein (i) the network comprises a yarn and (ii) the yarn is configured to provide actuation in the yarn length direction.

10. The actuator of claim 1, wherein the network comprises a sheet or sheet strip and wherein a length, width, or thickness of the sheet or sheet strip, or any combination thereof, is configured to change during the actuation.

11. The actuator of claim 1 wherein the actuating electrode comprises at least two weakly laminated nanofiber sheets or sheet strips that are effectively end supported in the length direction using at least one flexible end support, and wherein the actuation occurs at least in part because of substantially reversible delamination and lamination of these weakly laminated sheets or sheet strips.

12. The actuator of claim 1, wherein the network of electrically interconnected nano fibers comprises nanofibers that are predominately oriented in one direction.

13. The actuator of claim 1, wherein the network of electrically interconnected nanofibers is predominately an enthalpic rubber.

14. The actuator of claim 1, wherein the actuator is operable through actuator produced change in nanofiber network structure or properties to modify the polarization of light, switch the diffraction of light, modify the cold or hot emission of electrons, influence the effectiveness of an electrode for charge stripping from an ion beam, modify nanofiber sheet transparency, modify the appearance of an underlying surface, modify thermoacoustic emission, or any combination thereof.

15. The actuator of claim 1, wherein the actuator is operable to provide at least about 5% strain of actuation between about 0 K and about 1900 K.

16. The actuator of claim 1, wherein the actuator is operable to apply a positive potential to the nanofiber network.

17. The actuator of claim 1, wherein is the actuator is operable to achieve about 100% actuation in at least one dimension.

18. The actuator of claim 1, wherein the actuator is operable to achieve at least about 1% actuation in a direction along which the network nanofibers are predominately oriented.

19. The actuator of claim 1, wherein actuation modifies thermal conductance or thermal emission for the network of electrically interconnected nanofibers.

20. The actuator of claim 1, wherein the actuator is operable to convert mechanical energy to electrical energy.

21. The actuator of claim 1, wherein the actuator is operable for a mechanically operated display.

22. The actuator of claim 1, wherein (i) the actuator is operable for an incandescent lamp, (ii) the incandescent element in the lamp comprises the network of electrically interconnected nanofibers and (iii) actuation of the network of electrically connected nanofibers modifies the operation of the lamp.

23. The actuator of claim 1, wherein (i) the actuator is operable for a fluorescent lamp, (ii) the cold electrode electron field emission source of the lamp comprises the network of electrically interconnected nanofibers, and (iii) actuation of the network of electrically interconnected nanofibers modifies the operation of the lamp by modifying electron emission.

24. The actuator of claim 1, wherein (i) the actuator is operable for an x-ray source, (ii) the electron emission source of the x-ray source comprises the network of electrically interconnected nanofibers, and (iii) actuation of the network of electrically interconnected nanofibers modifies the operation of the x-ray source by modifying electron emission.

25. The actuator of claim 1, wherein (i) the actuator is operable for an antenna, (ii) the antenna comprises the network of electrically interconnected nanofibers, and (iii) actuation of the network of electrically interconnected nanofibers modifies characteristics of the antenna.

26. The actuator of claim 1, wherein (i) the actuator is operable for a thermoacoustic loud speaker or a thermoacoustic sound cancellation device, (ii) the thermoacoustic source comprises a nano fiber sheet or sheet strip, and (iii) actuation of the nano fiber sheet or sheet strip modifies thermoacoustic emission.

27. The actuator of claim 1, wherein (i) the actuator is operable for a gas flow detector, (ii) the gas flow detector comprises the network of electrically interconnected nanofibers, (iii) the network of electrically interconnected nanofibers is substantially in sheet or sheet strip form, and (iv) actuation of the network of electrically interconnected nanofibers modifies the characteristics of the gas-flow detector.

28. The actuator of claim 1 that is operated at a resonant frequency.

29. The actuator of claim 1, wherein the actuating electrode is comprised in a tunable diffraction grating.

30. The actuator of claim 1, wherein the actuating electrode is comprised in a tunable light polarizer.

\* \* \* \* \*